US009763064B2

(12) United States Patent
Ruff et al.

(10) Patent No.: US 9,763,064 B2
(45) Date of Patent: Sep. 12, 2017

(54) SYSTEMS AND METHODS FOR ACCESS-CONTROLLED INTERACTIONS

(71) Applicant: Evernym, Inc., Herriman, UT (US)

(72) Inventors: Timothy Ruff, Herriman, UT (US); Jason Law, Bluffdale, UT (US)

(73) Assignee: Evernym, Inc., Herriman, UT (US)

( * ) Notice: Subject to any disclaimer, the term of this patent is extended or adjusted under 35 U.S.C. 154(b) by 15 days.

(21) Appl. No.: 14/856,345

(22) Filed: Sep. 16, 2015

(65) Prior Publication Data

US 2016/0105776 A1 Apr. 14, 2016

Related U.S. Application Data

(63) Continuation of application No. 14/499,892, filed on Sep. 29, 2014, now abandoned, which is a (Continued)

(51) Int. Cl.
*H04W 4/08* (2009.01)
*H04L 12/911* (2013.01)

(Continued)

(52) U.S. Cl.
CPC ............. *H04W 4/08* (2013.01); *H04L 1/1621* (2013.01); *H04L 47/70* (2013.01); *H04L 51/08* (2013.01);

(Continued)

(58) Field of Classification Search
CPC ........... H04W 4/08; H04W 4/06; H04W 4/14; H04W 12/08; H04W 72/005;

(Continued)

(56) References Cited

U.S. PATENT DOCUMENTS 5,724,521 A 3/1998 Dedrick
5,841,871 A 11/1998 Pinkas (Continued)

FOREIGN PATENT DOCUMENTS

EP 0 507 125 A2 10/1992
WO WO 2011/157142 A2 12/2011

OTHER PUBLICATIONS

Anonymous: "Session (computer science)—Wikipedia, the free encyclopedia," Nov. 24, 2012, retrieved from the Internet: URL:https://en.wikipedia.org/w/index.php?title=Session_(computer_science)&oldid=524719118 [retrieved on Aug. 9, 2016], *the whole document*, 5 pgs.

(Continued)

*Primary Examiner* — Abdelnabi O Musa
(74) *Attorney, Agent, or Firm* — John R. Thompson; Stoel Rives LLP

(57) ABSTRACT

An interaction server controls access between a plurality of senders and/or users exchanging electronic interactions. A sender may identify a user with whom the sender desires to interact using a public identifier associated with the user. The interaction server may coordinate the desired interaction without revealing private information, such as information about private user resources (e.g., personal contact information, personal payment information, personal data, etc.). The interaction server may determine whether to provide an interaction by evaluating an access code, by determining whether a user is trusted, and/or the like. The interaction server may provide the interaction, a notice of the interaction, a payload associated with the interaction, and/or the like to a user resource associated with the public identifier if access is allowed.

32 Claims, 11 Drawing Sheets

Related U.S. Application Data continuation of application No. 14/151,590, filed on Jan. 9, 2014, now Pat. No. 8,874,770.

(60) Provisional application No. 61/750,634, filed on Jan. 9, 2013.

(51) Int. Cl.

| | |
|---|---|
| ***H04L 12/58*** | (2006.01) |
| ***H04L 29/06*** | (2006.01) |
| ***H04W 4/06*** | (2009.01) |
| ***H04W 4/14*** | (2009.01) |
| ***H04W 12/08*** | (2009.01) |
| ***H04L 1/16*** | (2006.01) |
| ***H04W 72/00*** | (2009.01) |
| *H04L 29/08* | (2006.01) |
| *H04W 4/02* | (2009.01) |
| *H04W 4/22* | (2009.01) |

(52) U.S. Cl.

CPC ............ *H04L 51/12* (2013.01); *H04L 63/104* (2013.01); *H04W 4/06* (2013.01); *H04W 4/14* (2013.01); *H04W 12/08* (2013.01); *H04W 72/005* (2013.01); *H04L 67/306* (2013.01); *H04W 4/028* (2013.01); *H04W 4/22* (2013.01)

(58) Field of Classification Search

CPC ...... H04W 4/028; H04W 4/22; H04L 1/1621; H04L 47/70; H04L 51/08; H04L 51/12; H04L 63/104; H04L 67/306

See application file for complete search history.

(56) References Cited

U.S. PATENT DOCUMENTS

| | | | | |
|---|---|---|---|---|
| 6,055,510 | A | 4/2000 | Henrick et al. | |
| 6,161,185 | A | 12/2000 | Guthrie et al. | |
| 6,885,871 | B2 | 4/2005 | Caloud | |
| 7,010,565 | B2 | 3/2006 | Sampson | |
| 7,130,389 | B1 | 10/2006 | Rodkey et al. | |
| 7,239,860 | B2 | 7/2007 | Stoks | |
| 7,301,450 | B2 | 11/2007 | Carrino | |
| 7,664,233 | B1 | 2/2010 | Kirchmeier et al. | |
| 7,706,253 | B1 | 4/2010 | Pampati et al. | |
| 7,827,234 | B2 | 11/2010 | Eisenberger et al. | |
| 7,877,682 | B2 | 1/2011 | Aegerter | |
| 8,102,974 | B2 | 1/2012 | Ordille et al. | |
| 8,224,284 | B2 | 7/2012 | Foladare et al. | |
| 8,230,488 | B2 | 7/2012 | Chiba et al. | |
| 8,243,910 | B2 | 8/2012 | Chen et al. | |
| 8,280,012 | B2 | 10/2012 | Kirchmeier et al. | |
| 8,291,011 | B2 | 10/2012 | Abu-Hakima et al. | |
| 8,315,595 | B2 | 11/2012 | Murphy et al. | |
| 8,316,128 | B2 | 11/2012 | Beck et al. | |
| 8,416,933 | B2 | 4/2013 | Hartley et al. | |
| 8,424,057 | B2 | 4/2013 | Mardikar et al. | |
| 8,468,584 | B1 | 6/2013 | Hansen | |
| 2001/0056359 | A1 | 12/2001 | Abreu | |
| 2002/0072996 | A1 | 6/2002 | Paiz | |
| 2002/0087704 | A1* | 7/2002 | Chesnais ............ | H04L 12/5835 709/228 |
| 2002/0120568 | A1 | 8/2002 | Leblang et al. | |
| 2002/0138622 | A1 | 9/2002 | Dorenbosch et al. | |
| 2002/0159601 | A1 | 10/2002 | Bushmitch et al. | |
| 2003/0130857 | A1 | 7/2003 | Matsuo | |
| 2003/0225590 | A1 | 12/2003 | Weber | |
| 2004/0111480 | A1 | 6/2004 | Yue | |
| 2004/0196968 | A1 | 10/2004 | Yue | |
| 2005/0015443 | A1* | 1/2005 | Levine ............... | H04L 12/5835 709/204 |
| 2005/0044159 | A1* | 2/2005 | Niemi .................. | H04L 12/581 709/207 |
| 2007/0043608 | A1 | 2/2007 | May et al. | |
| 2008/0013712 | A1* | 1/2008 | Gopinath ........... | H04M 3/4931 379/218.01 |
| 2008/0140845 | A1 | 6/2008 | Yates et al. | |
| 2009/0016524 | A1 | 1/2009 | Park et al. | |
| 2009/0178128 | A1 | 7/2009 | Chiba et al. | |
| 2009/0271873 | A1 | 10/2009 | Ram et al. | |
| 2010/0017599 | A1 | 1/2010 | Sellars et al. | |
| 2010/0111276 | A1* | 5/2010 | Hartley ................ | H04L 63/102 379/142.05 |
| 2011/0134843 | A1 | 6/2011 | Noldus et al. | |
| 2011/0282931 | A1 | 11/2011 | Chen et al. | |
| 2012/0203909 | A1 | 8/2012 | Kavanaugh et al. | |
| 2012/0215620 | A1 | 8/2012 | Rodkey et al. | |
| 2012/0270567 | A1 | 10/2012 | Johnson | |
| 2012/0271883 | A1 | 10/2012 | Montoya et al. | |
| 2012/0290421 | A1 | 11/2012 | Qawami et al. | |
| 2012/0290953 | A1 | 11/2012 | Russell et al. | |
| 2012/0303439 | A1 | 11/2012 | Flitcroft et al. | |
| 2012/0330823 | A1 | 12/2012 | Niejadlik | |
| 2012/0331162 | A1 | 12/2012 | Jung et al. | |
| 2013/0066945 | A1 | 3/2013 | Das et al. | |
| 2013/0198811 | A1 | 8/2013 | Yu et al. | |
| 2013/0254314 | A1* | 9/2013 | Chow .................... | H04L 67/06 709/206 |

OTHER PUBLICATIONS

Celly Blog, "Celly is here to reinvent your phone," http://blog.cel.ly/celly-is-here-to-reinvent-your-phone/, Jan. 15, 2011, 2 pgs.

Spamgourmet—frequently asked questions, http://spamgourmet.com/index.pl?printpage=faq.html, date accessed Jan. 8, 2013, 9 pgs.

bbs.spamgourmet.com—View topic—"Rethinking SpamGourmet's Approach," http://bbs.spamgourmet.com/viewtopic.php?f=2&t=273&p=1246&hilit=milter&sid=456e7ce8601505f707f07ab9afddc2cd#01246, Jun. 30, 2004, 8 pgs.

Official Gmail Blog: 2 hidden ways to get more from your Gmail address, http://gmailblog.blogspot.com/2008/03/2-hidden-ways-to-get-more-from-your.html, Mar. 5, 2008, 2 pgs.

One Call Now—School Phone Calling Tree—School Calling Tree, One Call Now, http://www.onecallnow.com/automated-notification-system/school-phone-calling-tree, date accessed Jan. 8, 2013, 2 pgs.

The Beginner's Guide to Twitter, Mashable, http://mashable.com/2012/06/05/twitter-for-beginners/, Jun. 5, 2012, 11 pgs.

Rive, Grace et al., "Social Media in an emergency: Developing a Best Practice Guide—Literature Review," http://www.gwrc.govt.nz/assets/Emergencies-Hazards/WREMO/Publications/Social-Media-Literature-Review-FINAL-JUNE-2012.pdf, (c) Opus International Consultants Limited 2011, 44 pgs.

Freeman, Michael J. et al., "Tarzan: A Peer-to-Peer Anonymizing Network Layer," http://mirror.robert-marquardt.com/anonbib/cache/tarzan:ccs02.pdf, (c) 2002 ACM 1-58113-612-9/2/0011, 2002, Nov. 18-22, 2002, Washington, DC, 14 pgs.

International Search Report and Written Opinion for PCT/US2014/010905 filed Jan. 9, 2014, and dated from the International Searching Authority on Feb. 28, 2014, 9 pgs.

Non-Final Office Action for U.S. Appl. No. 14/151,590, filed Jan. 9, 2014, and dated from the USPTO on Apr. 3, 2014, 10 pgs.

Notice of Allowance and Fee(s) Due for U.S. Appl. No. 14/151,590, filed Jan. 9, 2014, and dated from the USPTO on Jul. 11, 2014, 5 pgs.

Non-Final Office Action for U.S. Appl. No. 14/499,892, filed Sep. 29, 2014, and dated from the USPTO on Mar. 20, 2015, 11 pgs.

International Preliminary Report on Patentability for PCT/US2014/010905 filed Jan. 9, 2014, and dated from the International Bureau on Jul. 23, 2015, 6 pgs.

* cited by examiner

SYSTEMS AND METHODS FOR ACCESS-CONTROLLED INTERACTIONS

RELATED APPLICATIONS

This application is a continuation of and claims priority to U.S. patent application Ser. No. 14/499,892, filed Sep. 29, 2014, and entitled "Systems and Methods for Access-Controlled Interactions," which is a continuation of and claims priority to U.S. patent application Ser. No. 14/151,590, filed Jan. 9, 2014, and entitled "Systems And Methods For Access-Controlled Interactions," and which in turn claims priority to U.S. Patent Application Ser. No. 61/750,634 filed Jan. 9, 2013, and entitled "Systems and Methods for Access-Controlled Interactions," which are hereby incorporated by reference in their entirety.

TECHNICAL FIELD

This disclosure relates to systems and methods for controlling access to and interaction with user resources.

DETAILED DESCRIPTION OF PREFERRED EMBODIMENTS

Figure 1:
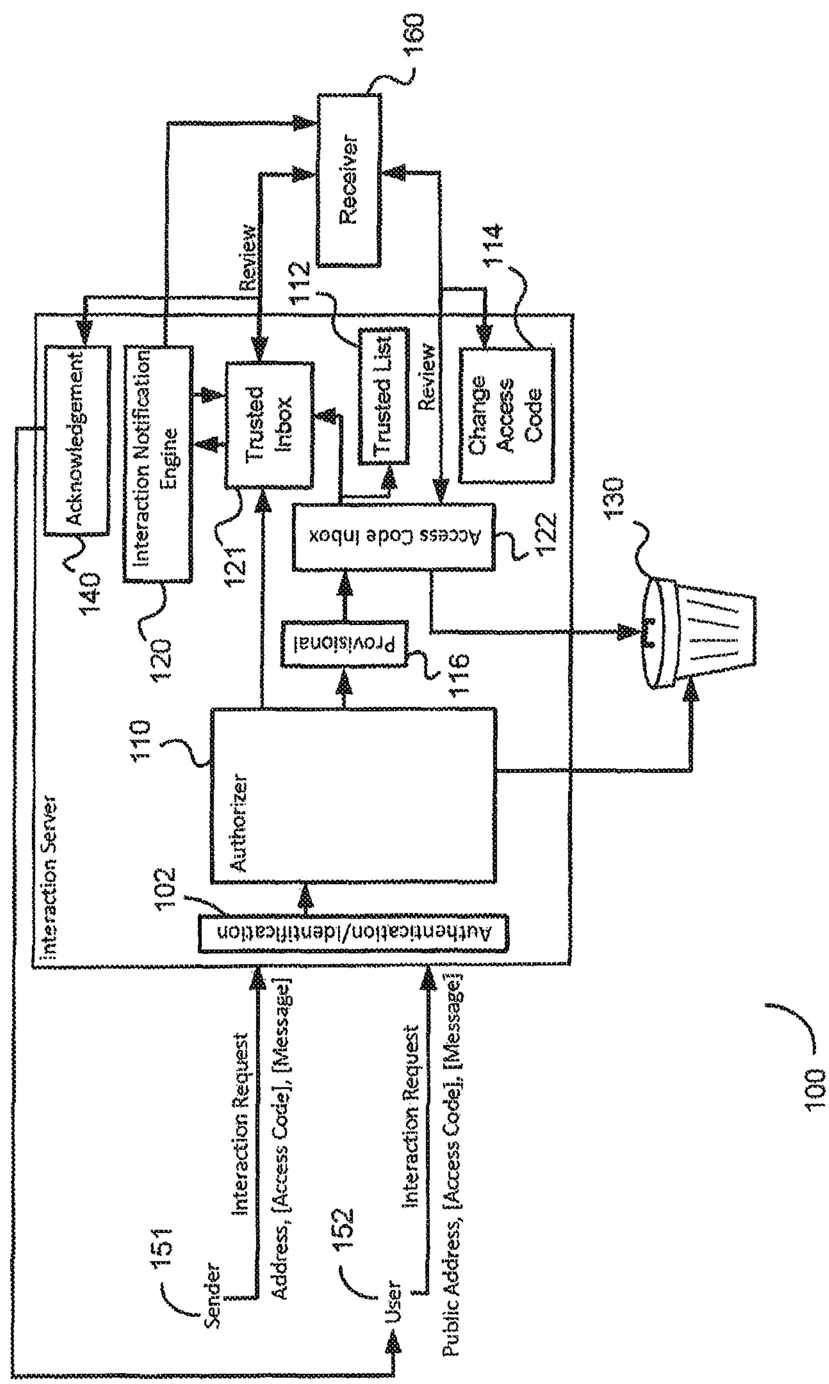
FIG. 1 is a schematic diagram of an interaction server configured to enable access-controlled interactions from senders.

The present disclosure introduces, inter alia, new communication and interaction methods and technologies able to resolve a number of difficult problems for interpersonal, business, and group interactions and/or mass communications. Currently, personal, and otherwise private, information, including personal identifiers, must be disclosed for one person to interact with another person or entity. This results in the forfeiting of control over that person, and otherwise private, information and the forfeiting of control over access to person, and otherwise private, resources. For example, personal contact information, such as an email address or phone number, must be disclosed for one person to contact another. However, if personal contact information becomes widely known and/or available, unwanted communications, such as spam or phone solicitations, may be received. There may be no way to stop the unwanted communications other than to change the personal contact information, which may be inconvenient, tedious, and/or impossible. The fear of unwanted solicitations and other communications often makes users hesitant to provide their personal contact information to merchants and the like. Merchants are often put in a "fox guarding the hen house" position when receiving an "unsubscribe" request from a user (e.g., a request from an owner of an email address that the merchant no longer use the email address).

Also, children are increasingly engaged in and dependent upon electronic communications with others, such as their school teachers, yet children may be particularly vulnerable to inappropriate or undesirable electronic communications and stand in need of a safe way to electronically communicate. Also, there is no universal, cross-platform method for companies to control, monitor, and/or record all electronic communications made by their employees, whether the communication is from home or work, using a company phone or personal phone, and regardless of method (e.g., email; short message service (SMS); pager messages; smartphone notifications; in-app messages in mobile, web, or desktop applications; calls to external web services or APIs; chat client messages of various protocols; instant message (IM); voice; etc.).

In addition, there are several limitations with current methods of interpersonal communications, especially when the communication is urgent. No method exists to automatically escalate urgent or emergency communications across multiple disparate communication methods, such as from an email message to an SMS message to a phone call, and/or to repeat attempts at regular intervals, until the intended recipient has confirmed receipt. This leaves a sender of an urgent message with only manual escalation options—attempting different phone numbers, email addresses, other devices, other people, etc., one at a time—which may only work if the sender is in possession of the necessary contact information and/or subscribing to similar systems as the receiver (such as subscribing to the same IM provider, for example). Similarly, to be reached for urgent communications, one must divulge their personal contact information to all potential senders, with all the attendant privacy problems mentioned previously.

Privately Public Interaction

"Privately public" interaction may allow a user to use one interaction address, such as a communication address, that does not need to be changed no matter how public it becomes, and for others to use that address to interact with the user with multiple methods—email, SMS, MMS, IM, voice, video, personal computer, and the like—without possessing any of the user's other contact information (phone numbers, email addresses, etc.). Moreover, the user may prevent unapproved others from interacting with the user and/or accessing user resources even if they possess the user's interaction address, and the user may revoke anyone's abilities to interact with the user at any time without having to replace the interaction address. This provides privacy and control for the user and a simple, convenient, and effective means for others to interact with him or her. Further, interactions directed to the one interaction address may be routed to the user via phone numbers, IM addresses, email addresses, social media addresses, and the like. Only the interaction address, and sometimes an access code, needs to be given out for any method of interaction to be conducted.

Interaction Server

Privately public interaction may be facilitated by an interaction server. The interaction server may control interactions, such as electronic or other communications, between and among users, non-users, and/or devices. The interaction server may be used for various methods of interaction including application to application, email, SMS/MMS messaging, telephone calls, faxes, audio/video conferencing, webinar/screen sharing, instant messaging, postal mail, social media messaging and posting, data verification, data transfer, validation, authentication, and/or any other method of interaction. The interaction server may receive an interaction, such as an interaction request, intended for a user from a sender who is a user or a non-user. The interaction request may be implicit. For example, the sender may not know he or she is interacting with an interaction server, and may just be attempting to send a message using a conventional paradigm. The interaction request may be received at the interaction server via one or more of a plurality of methods, such as an application interface, email, SMS, phone calls, IM, web service, API, a request to process postal mail, and the like. The interaction server may route the interaction request, a notice of the request, physical mail, or the like to the intended user/receiver through one or more of a plurality of methods, such as an application, email, SMS, phone calls, IM, postal mail, and the like. The receiver may respond to the sender through the interaction server using the same or a different method. The receiver may respond to the sender in another way, without using the interaction server. A history of all messages and/or interaction requests may be recorded and stored locally or remotely.

In some embodiments, a message center may store a record of sent and/or received interaction requests and/or messages. The message center may store the interaction requests and/or messages even if copies of or links to the messages or requests have been routed elsewhere. The message center may include one or more data structures, such as a database, list, stack, queue, or the like, to store the messages. A user may log in to the message center to view the messages. The message center may be displayed to the user as one or more mailboxes, folders, directories, lists, etc. The user may be able to interact with the messages accessed through the message center including forwarding, replying, and/or the like.

Public and Private Addresses—a Single, Unique Public Identifier

A user may register a public address with the interaction server. The address may be in a variety of forms, such as a string including numbers, letters, and/or other symbols or characters. The user may use the public address as a single, unique public identifier to which multiple types of interaction—email, SMS, IM, phone, postal mail, etc.—are addressed. The interaction server may receive interaction requests, such as communication requests, and route them to user resources, such as client devices or physical addresses designated by the users (the case of physical postal mail is described below). The client devices/locations may be identified by private addresses and/or users running proprietary applications. The private addresses may include information not visible to the sender of the interaction, such as email addresses, telephone numbers, screen names, postal addresses, social media addresses, and the like.

The public address may be modified and/or diverted so as to successfully deliver interaction requests to the interaction server via different methods. For example, for a user with the public address of SUPERMAN123, interaction requests may be addressed to SUPERMAN123@example.com and sent to the interaction server via email. Interaction requests sent via SMS to SUPERMAN123@example.com may also be received by the interaction server. Phone calls may be sent through a calling application compatible with directly dialing SUPERMAN123, sent by dialing a general number where the caller is prompted to provide SUPERMAN123, sent by dialing a specific number associated with SUPERMAN123, or the like. This process may be automated by using an app on a smartphone that facilitates the process. For example, the user may simply select SUPERMAN123 and indicate that a voice interaction is desired. Ns may be re-directed to the interaction server, may be re-directed to a service compatible with the interaction server, or a proprietary IM service may be used.

Rules

Users may specify interaction rules that determine how incoming interactions are routed. The interaction rules may be general or customized for certain senders or groups, categories, or types of senders, such as non-users, new users, users in a directory or a group within a directory, and the like. The rules may be general or customized by the type of interaction request received, such as voice, text, request, and the like. The rules may include if, how, and/or where to deliver voice, text, or physical mail communications; acknowledgement preferences; the location of the user; allowed or preferred private addresses (phone numbers, email addresses, etc.); allowed, blocked, or preferred senders; rules for handling and/or escalating urgent or emergency messages; blackout periods in which all or some interaction requests may be blocked or held until the end of the blackout period; the duration for which access is granted; when each method of interaction is permitted (e.g., time of day, day of week, etc.); whether personal contact information or other data is visible to other users and/or non-users; if and/or how to display the sender in a directory of contacts; and the like. Users may be permitted to change the interaction rules at will.

An interaction request may specify the type of interaction requested. The type of interaction requested may be a generic method of communication, such as written message, voice message, live voice, and the like; a specific method of communication that is desired, such as email or a phone call; or the like. The interaction server may evaluate the rules to transmit the interaction request to one or more client devices designated by the user. For example, the interaction server may forward a written message to an e-mail address, route a phone call or fax to the appropriate telephone number, or the like. The interaction server may evaluate the interaction rules to determine if and/or how client devices may receive the interaction request. Exemplary client devices may include a phone, pager, computer, server, smartphone, tablet, personal digital assistant, and/or the like. Accordingly, a written message may be transmitted to a user as an IM if the user is at work or a text message if the user is not at work, for example. The user's location may be determined from GPS data, login status, time of day, cascading through devices, or the like. Client devices may be running an application to send and/or receive interactions.

Instead of placing a traditional phone call, a "caller" might instead simply request a voice interaction using an app through the interaction server. If the recipient is available, he or she may accept the interaction and a voice chat or phone call may ensue. If the recipient is not available, the recipient may respond with a time or duration when he or she would be available, or simply not respond at all. When the recipient becomes available, he or she can simply respond to the original interaction request and the voice chat or phone call may ensue. If the original requester is unavailable by the time the recipient is available, the original requester may respond similarly indicating when he or she might be available. In this manner, the interaction server may facilitate efficient interaction, solving the problems associated with traditional "phone tag".

Using the interaction server, a user may indicate their level of availability, which can be used for escalation and/or routing communication to or through various communication mechanisms or devices. The user may also choose to publish their level of availability to all users and/or to trusted other users in order to help set expectations of individuals who wish to interact with the user. Interaction escalation and routing may be affected by a receiver's level of availability, the receiver's level of trust of the sender, and/or the sender's stated urgency.

A first person, whether a user or a non-user, may attempt to interact with a second person through a regular private address, such as a regular phone number or email address. The second person may prefer interacting using the interaction server and may have such incoming interactions automatically diverted by service providers to the interaction server where interaction rules may again apply, such as restrictions, routing, escalation, permissions, and the like. Interaction rules may be based on the originating phone number, originating email address, time of day, and the like.

Access Codes

The interaction server may restrict unwanted interaction requests, including unwanted communications, from being sent to users. The interaction server may allow only certain interaction requests and not others. One method of controlling access may be through the use of access codes. Interaction requests may include an access code, and the interaction server may determine whether interaction requests are authorized for the received access code. The interaction server may require that an access code be registered with the interaction server before that access code is used by a sender. The interaction server may also dynamically allocate access codes when an interaction request with a new access code is received. An unlimited number of messages and/or an unlimited number of different senders may use an access code. If access code functionality is enabled and an interaction request arrives without an access code, the sender may be prompted to enter one and/or the request may be ignored. Ignored requests may be stored such that the receiver may choose to review blocked or ignored interaction requests. The interaction server may reject and/or bounce interaction requests without valid access codes before the entire interaction request has been downloaded by the interaction server to save bandwidth.

In one embodiment, when sending or receiving a written message, the access code may be added as a suffix or prefix to the local part of an email address and set off by a special character, such as a tilde, (e.g., "user1~56aQ1nE3@example.com"), and the email message itself may serve as the interaction request.

Users may issue valid new access codes and revoke access codes at will, such as when interaction is no longer desired or unwanted interaction requests begin arriving with a particular access code. If an interaction request does not have a valid access code, a bounce message and/or a prompt to enter a correct access code may be returned, and the user may not receive the interaction request or a notice of the attempt. If access code functionality is not enabled by a user, interaction requests addressed to the user's public address and including any access code or not including an access code may be received by the user.

Interaction rules may be specified for each access code. For example, messages with certain access codes may be treated as unverified interaction requests, whereas other access codes may grant specific rights. For example, "4428" may be an access code for important new contacts who automatically become trusted senders when using that access code; "7726" may be an access code that is treated as spam and routed to a spam or unverified inbox and/or tagged as spam; "soccer" may be an access code that automatically tags senders as new contacts under a "Soccer Team" heading. For a particular access code, interaction via all interaction methods may be authorized, and/or only certain interaction types and/or methods may be used. Some access codes may allow messages to be sent to a verified mailbox and/or allow live communication, whereas other access codes may allow one or neither of these rights. In some embodiments, the interaction server may include the access code used for access with forwarded messages, so the user may filter received messages (e.g., "soccer" may be filtered to a soccer folder, and "7726" may be filtered to a bulk folder). Alternatively, or in addition, the interaction requests may be sent to different inboxes based on the access code used. The interaction requests may be sorted, displayed, tagged, grouped, etc. within a message center and/or a mailbox based on the access code used. Interaction requests and/or messages received with an access code may display or otherwise encode the access code used along with the interaction request and/or message, for the reference of the user.

Interaction rules for access codes may include the methods of interaction allowed, how to handle urgent and emergency messages, whether escalation of such messages is allowed, the frequency, sequence, and types of interactions to use when escalating, the duration that access is granted for, when each method of interaction is permitted (e.g., time of day, day of week, etc.), whether personal contact information or other data is visible, if or how to display the sender in a directory of contacts, how replies to senders are formatted and/or handled, and the like. Users may be permitted to change the interaction rules for access codes at will, including revoking access codes. Interaction rules for access codes may set the default interaction rules for a particular sender, which may be changed or customized or maintained later. For example, a sender may inherit default interaction rules from the first access code used by the sender. Interaction rules may also be used to aggregate or consolidate messages from a particular sender or group of senders such that a "digest" of sorts can be presented to the receiver. Instead of multiple similar messages showing up as separate messages, they may be consolidated into one message, wherein the receiver may view a single message that summarizes the multiple interactions.

Trusted Senders

Another method the interaction server may utilize to restrict access may be designation of trusted senders ("trusting"). Trusting may be used by itself or in combination with other methods of restricting access, such as access codes (e.g., the interaction server may allow trusting and/or access codes to be selectively enabled or disabled). Using both trusting and access codes may achieve two significant benefits of "privately public" interaction: the public use of an interaction address without fear of unstoppable unwanted interaction requests and without disclosure of private addresses. For example, if unwanted interaction requests are received from a trusted sender, that sender may be un-trusted and/or blacklisted, preventing further interaction. The interaction server may reject and/or bounce interaction requests from blacklisted senders before the entire interaction request has been downloaded by the interaction server to save bandwidth. If unwanted interaction requests are received from senders using a valid access code but not yet trusted, the access code may be revoked without affecting future interactions with trusted senders, and without having to change the public address. In an embodiment, a trusted sender may be required to use a valid access code for the interaction request to be received by the user.

Users may designate certain other users and/or non-users as trusted senders and automatically allow some or all communications and/or interaction requests from those users. Other users, email addresses, phone numbers, mailing address, IM addresses, and the like and/or entities or accounts owning one or more of these addresses may be designated as trusted senders. Messages from new senders and/or new addresses may be flagged, grouped, identified, marked, and/or the like until a trust level has been established by the user. Senders may be designated as trusted before or after they have sent interaction requests to a user. Interaction and/or communication addresses may be designated as trusted before or after the user has received interaction requests and/or communications from them. Senders and/or addresses may be designated as trusted individually or in groups, from a list, directory, file, folder, database, and/or the like. Entire domains, sub-domains, zones, area codes, zip codes, ranges, and the like may be trusted or un-trusted (e.g., blacklisted). Users may establish rules and/or execute steps by which senders are trusted, such as automatically trusting every recipient to whom the user has previously sent a message.

Communications and/or interaction requests from trusted senders may be allowed even if no access code is included or an incorrect access code is included with an interaction request, and/or if access code functionality is disabled altogether. Trusted senders may be authenticated via a login process, a digital signature, ensuring an IP and/or email address is not spoofed, Sender Policy Framework (SPF) records, third-party validation, and/or the like. Interaction rules may be specified for each trusted sender and/or default interaction rules may be used for a plurality of trusted senders. The interaction rules for trusted senders may include different levels of trust for different activities, such as the methods of interaction allowed, how to handle urgent and emergency messages, whether escalation of such messages is allowed, duration as a trusted sender, when each method of interaction is permitted (e.g., time of day, day of week, etc.), whether the trusted sender may view personal contact information or other data of the user, if or how the trusted sender is included in a directory of contacts, how replies to the sender are formatted and/or handled, and the like. It may also be possible for a user to blacklist other users, non-users, and/or interaction addresses of any type so all communications and/or interactions are blocked, and previously granted permissions are revoked. A blacklisted user may remain blocked even if the user attempts to interact using a new private address and/or a valid access code. Users may be permitted to change the interaction rules for trusted senders at will, including revoking trusted sender status or modifying the level of trust and/or permissions.

The interaction rules may allow third parties who are trusted by a first user's trusted senders ("trusted senders of my trusted senders") to be automatically trusted, trusted on a case-by-case basis, trusted only for certain types of interactions, etc. If this rule is disabled, the mutual acquaintance may be requested to make an introduction. Users may be able to send requests for trust to other users without a valid access code, but users may be permitted only a limited number of trust denials before the ability to send requests for trusted status is revoked. The trusting of senders may be crowd-sourced based on the trusting decisions made by other users. Trusting statistics of decisions by other users may be shared with the user when the user is deciding whether to trust the sender, and/or the user may establish rules for automatically trusting or not trusting senders based on the trusting decisions of other users.

Different mailboxes, folders, labels, tags, flags, groupings, or the like may be used to identify messages from trusted senders versus non-trusted senders, among different trusted senders, and/or the like. For example, a verified or trusted inbox may hold messages from trusted senders whereas another inbox may hold messages from non-trusted senders. Alternatively, or in addition, messages may be sorted, displayed, tagged, grouped, etc. based on the trust level of the sender and/or the use of an access code. Once a non-trusted sender is designated as trusted, the sort, display, tags, etc. of the messages sent by that sender may change. For live voice or live video requests, trusted callers may be allowed to ring through to the user, whereas a non-trusted caller may be automatically routed to a voice mail or other messaging system or prompted to identify themselves and/or provide an access code, and/or the incoming call attempt may cause an alert to be sent to the user.

For interaction requests received from non-users, a provisional and/or temporary account may be created that enables the trusting process, with or without any action on the part of the user receiving the request or the non-user. By this method, users may use the trusting, communication consolidation, acknowledgement delivery, and other features of the interaction server to interact with non-users. Some features and capabilities that users enjoy may be used and/or made available to non-users when the non-users interact with users, such as prompting the non-user for confirmation of receipt by including a link or a button on an email message, notifying the non-user when their message has been received and/or acknowledged, escalating between a non-user's known interaction addresses and/or devices until that confirmation has been received, and the like. Users and non-users may mark messages with hash tags and/or other characters to leverage features of the interaction server (e.g., #task for a task assignment (discussed below), #urgent for an urgent message (discussed below), or the like). Non-users with provisional accounts may convert their provisional account to a permanent account and may be provided with a means to merge multiple provisional accounts into a single regular account.

Urgency

Prior to the present disclosure, for a first person to interact electronically with a second person, the first person needed to select a known interaction address of the second person (such as a phone number, Skype (or similar service) username, email address, SMS number, IM name, and the like) and attempt interaction. If the interaction attempt is unsuccessful, the first person then needed to attempt another address (if it is known). When interacting via the interaction server, to interact via almost any interaction type, whether voice or text, the first person, whether a user or a non-user, may need only possess a single public address for the user (if the user has enabled access codes and/or trusting, a valid access code or prior acceptance as a trusted sender may also be required). The first person may not need to possess any phone numbers, email or other addresses of the user with whom they are attempting to interact, and yet multiple addresses and/or types of communication (such as voice and text) of the user may be attempted until the user is successfully reached.

In an embodiment, a first person may select the public address of the user, the desired interaction type (such as voice or written), and a level of urgency. When urgency is not indicated on an interaction, it may default to normal or low. Interactions from the first person may be processed according to interaction rules for the corresponding urgency established in the interaction server for the user. For example, the first person may indicate that a written message is of normal urgency, and the user's rules may specify email as the preferred delivery medium for normal-urgency text/written messages. Messages from the first person indicated to be of a higher urgency may trigger the high-urgency delivery rules for the user, such as repeated SMS messages, simultaneous or sequential dialing of multiple phone numbers, and the like.

Escalation

Users may grant other users, non-users, and/or zones (defined below) rights to send to the user emergency or other urgent messages. Users may establish certain access codes as urgent or emergency access codes. The access code, sender, zone, and/or another field in the interaction request may indicate that the message is an urgent message, and/or the message may include an urgency indicator indicating a specific level of urgency (e.g., low, normal, urgent, and emergency).

When a user receives a message with an urgency indicator, the interaction server may escalate the urgent message by sending it repeatedly, via multiple interaction methods (e.g., voice, text, etc.), to multiple addresses and/or devices sequentially or simultaneously, at predetermined intervals, and/or the like. The interaction server may continue escalation until the message is acknowledged. The urgent message may be sent sequentially via multiple interaction methods, with a predetermined interval between transmissions by each interaction method, and/or the urgent message may be sent via selected interaction methods simultaneously with a predetermined interval between each set of simultaneous transmissions, or the like. If a user views their message center and/or inbox, the message may be flashing red or the like to indicate that it is currently being escalated. The interaction server may be configured to change the volume on a device (e.g., changing a smartphone volume from silent to maximum volume), cause it to vibrate, flash lights, and the like, in an attempt to alert a user. The urgent message may also be escalated to a user's spouse, family, friends, co-workers, etc. or even complete strangers in the vicinity. The user may be enabled to snooze the urgent message, and the escalation may be delayed for a predetermined and/or user indicated snooze interval. The user may send a confirmation or acknowledgement message to the interaction server to end escalation. The interaction server may provide a confirmation or acknowledgement, or report of a lack thereof, to the sender of the message.

The interaction server may use GPS or other location-aware technologies to aid in reaching the intended user. The interaction server may escalate urgent messages to other users in the physical vicinity of the user. For example, if a user being notified is unaware of the notification because their mobile phone ringer is off or their battery has died, other users in the vicinity could be alerted to look for the intended user and convey the message. Location data may also be used to dynamically change the escalation order. For example, when a user is at the office, the office phone numbers and IM accounts may be alerted first; when a user is at home, the escalation order may be dynamically changed so that the home number and personal IM accounts may be alerted first.

The user may be able to define escalation rules and settings that determine which interaction methods are used, the order in which those interaction methods are used, the intervals between attempts for emergency messages, and the like. The user may select escalation settings for each sender, zone, and/or access code, and/or the user may use default settings for multiple senders, zones, access codes, and the like. If the sender is abusing emergency rights, the second user may revoke or modify the emergency rights. All messages from the sender may then be treated as non-urgent messages. Alternatively, the user may permit escalation only at certain times of day, days of week, weeks of the year, etc. Conversely, if a sender is regarded by the receiver as very important (a VIP), such as the receiver's child or the receiver's work supervisor, certain or all types of interactions may be automatically escalated, irrespective of the urgency indicator included with the interaction request, or the urgency level specified may be automatically upgraded to the next higher urgency level, or the like.

Relationships

The interaction server may allow relationships between users including parent-child, employer-employee, peer-to-peer and the like. A parent account may be able to control interaction rules for and access to a child account. Thus, the parent may be able to designate trusted senders, issue and revoke access codes, establish or modify interaction rules, control use of and access to other account features, and the like. The parent may choose to have all interaction requests or all unverified interaction requests addressed to the child to be held, invisible to the child. The parent may then approve interaction requests and allow them to be sent to the child. The parent may choose to allow interaction requests from certain trusted senders and/or comprising certain access codes to be sent to the child without requiring approval. Thus, parents may provide a safe, controlled way for children to enjoy the benefits of electronic interaction.

Zones

Users may be able to associate their accounts with companies or organizations through the use of zones. Zones may allow zone owners or administrators to control the look and feel of their members' interactions and monitor content. An organization may register a zone with the interaction server. The organization may then invite or permit certain users to associate with the zone and may generate unique addresses for those users that may be used in conjunction with the zone. A unique address used in conjunction with a zone (e.g., "Sam.Jones{company1}", with the zone contained inside the braces) may function like and be interchangeable with the public address described previously; interaction requests may be restricted, trusted senders identified, and the like. For example, a user Sam Jones may use "Sam.Jones{company1}" and "1234" when giving out his zone-provided public address along with a valid access code. As with the "privately public" system described earlier, once a sender is identified as a trusted sender, the access code may no longer be necessary and "Sam.Jones{company1}" may be sufficient for trusted senders to successfully interact with Sam.

Unique addresses with zones may be part of a new user account or associated with a user's existing account. Unique addresses with zones may be associated with an existing account only when permission is granted by the account owner. When a user disassociates from an organization, that user may be removed from the associated zone. A user may be associated with a plurality of zones. For example, while user Sam Jones may use "SamJones123" as his personal public address, he may also associate it with "Sam.Jones{company1}" and "CoachJones{soccerteam1}."

An email message may be addressed to "Sam.Jones{company1}@example.com," for example, with the zone contained inside the braces. An email addressed with a zone and an access code might look like Sam.Jones{company1}1234@example.com. If an organization's email communications are forwarded to the interaction server for processing, email messages from trusted senders may be sent to sam.jones@company1.com, for example, without requiring the zone in braces, resulting in "privately public" interactions being transparently provided to an organization's interactions within an email format.

A user may be allowed by the zone administrator to control certain aspects of his zone-related interactions but not others. For example, the user may be allowed to control some or all rules for receiving interactions or identifying trusted senders, but not allowed to modify other rules or settings such as the look and feel of interactions, editing certain contacts in the zone directory, etc. Users may access the zone through signing in to their own personal account with which the zone is associated, or through a separate sign in process established by the zone. Even though a zone may be associated with a personal account and the user may access the zone through that personal account, the zone administrator may have no access to the user's personal account.

The interaction server may segregate interactions according to each zone and by non-zone interactions. A user may specify alternate interaction rules for each zone, such as only allowing a work phone and work email to receive calls and messages addressed to a zone associated with work, and/or the user may apply default interaction rules to both zone and non-zone interactions. Contacts may also be segregated by zone. Thus, an interaction request sent to a contact associated with a zone may be automatically branded with a predetermined signature, look/feel, return address, etc. For contacts associated with multiple zones, the user may select which zone and/or branding to apply. The interaction server may also determine zone-associated phone usage and non-zone associated phone usage, so the organization and user may precisely account for usage, costs, etc.

A zone administrator and/or one or more users with ownership privileges may be able to specify zone settings and/or view and control all interactions and data associated with the zone. The zone administrator and/or privileged users may be able to add associated users to groups and/or sub-groups within the zone; interact with the associated users including sending interaction requests based on group, sub-group, physical location, department, and the like; remove users from the zone; make global changes affecting all associated users; designate and remove trusted senders; manage access codes; force associated users to subscribe to channels, remove them from subscribing to channels, and/or approve the subscription to channels; share directories among associated users, groups, sub-groups, etc.; record all interaction requests sent via any method of interaction, such as for compliance purposes; allow and disallow features within the zone, such as subscribing to channels or storing files; create a standardized web and/or social media page for each associated user; assign and monitor tasks and projects; submit requests; and the like.

A zone may be used for intra-zone interaction and collaboration with features and capabilities such as: uninhibited interaction between some or all zone members; shared contacts and directories; file sharing and data repositories; application sharing and collaboration; virtual bulletin board; shared calendaring; and the like.

Requests, Assignments, Tasks, Projects

Email, SMS messages, and hand-written letters are typically composed without any particular original structure. Users may compose new interaction requests as unstructured or create or use a different structure, such as requests, assignments, invitations, notifications, forms, multiple choice, fill-in-the-blank, and the like using formats, templates and/or tools. Recipients of interaction requests may respond according to the structure received, such as yes or no, a grant or denial of approval with or without added conditions, multiple choice, fill-in-the-blank, filling out a form, responding with an unstructured message, and the like. If multiple responses are requested of a user, a plurality of interaction requests and/or messages may be delivered with each requiring separate responses. Received interaction requests may be sorted based on whether a response is requested or no response is requested.

Interaction requests formed as assignments, tasks or the like may integrate with a task or project management system. Recipients may accept, reject, or otherwise respond to assignments or task requests. Requesters may view responses and track progress on tasks and/or projects. Tasks and/or projects may involve multiple parties, such as requesters, actors, sponsors, those to be informed, helpers, and the like. Authorized and/or invited parties may be notified or allowed to interact with the task and/or project data and/or other parties. Communications, notifications, other workflows, and other actions may be triggered upon the occurrence of certain events or thresholds, such as task completion, new comments, answers to queries, attachments or other data, approaching or passed deadlines, external data, and the like. Tasks, projects, conversations, actions, etc. may be stored within the interaction server, and/or local copies may be provided for offline access and other purposes, which copies can later be synchronized when online access is restored.

Workflows

The interaction server may facilitate simple or complex workflows. Users may use built-in, custom or external tools, templates, and the like to build electronic forms and processes for a workflow. A workflow process may include a series of steps to be executed by the interaction server. For each step, certain conditions may need to be satisfied before the step is executed. For example, an accounting department may create an expense reimbursement form and embedded workflow process within the interaction server. A first user may complete the form, which may trigger an alert to a manager for approval. The manager's approval may trigger an alert to the accounting department to reimburse the first user. A payment notification may be sent to the first user, who may then accept the payment. All parties may retain access to a permanent record of all aspects of the workflow transaction, including requests, responses, dates, names, approvals, denials, comments, attachments, notifications and the like.

Incoming Message Allocation

The interaction server may be configured to facilitate interaction on a one-to-many or many-to-many basis, such as when customers interact with a customer service department, for example. A plurality of individuals may be granted certain rights to receive and act upon interaction requests received by one or more user accounts, such as representatives within a customer service department, for example. Interaction requests may be automatically and/or manually separated by priority, urgency, VIP sender, and the like. Interaction requests may be automatically or manually assigned to one or more authorized individuals. Once assigned, an interaction request may be unavailable to other individuals, moved into a queue, marked with a certain status, and/or otherwise categorized or segmented from other interaction requests. Interaction requests may be transferred and/or escalated in several ways, such as moved up in priority, sent and/or assigned to different individuals or departments, different services, etc. Escalation may occur for different reasons, including a delay in response time, an urgency indicator, a VIP sender, and the like. An interaction between two parties may be begin in one form, such as text, and move or change to another form, such as when the parties may wish to initiate a phone call, video conference, or the like. The medium of interaction for an interaction request need not be the same for each party interacting. For example, the sender may wish to type or talk, while the receiver elects to display video to the sender, or vice versa. The sender or the receiver may wish to keep private their personal contact information, real identity, or other information. The sender or receiver may require certain information to be revealed or shared as a condition of interaction. The interaction server may be used to transfer files, share screens, engage in real-time instant messaging and/or collaborate in other ways. Access to a permanent record of each interaction may be retained for each party.

Mass Notification/Group Interaction

A mass notification system may be configured to send communications to addresses contained in a database of contact information. The mass notification system may be used primarily for urgent and/or emergency notification but may also sometimes be used for non-urgent communications. The mass notification system may have several significant limitations. The mass notification system may require a database of contact information to be gathered and maintained in order to "push" the notification to the group; but intended recipients are increasingly reluctant to provide personal contact information out of privacy fears, complacency, and/or the inconvenience of having to manage the same information in multiple disparate systems, such as one for a city, a different one for a school, etc. Further, maintaining the accuracy of contact information may quickly become be a never-ending uphill battle as group members move, disconnect or change numbers, change email addresses, leave the group, etc. Additionally, if the mass notification system is used for emergency evacuation purposes, it may be convenient to populate the database of contact information with land-line phone numbers obtained from telecommunications carriers; land-lines are increasingly being deactivated in favor of voice over IP (VoIP) and mobile phones, which may leave large gaps of missing phone numbers for residents that might require notification. The mass notification system may also be expensive, which may prevent use by smaller groups such as small schools, small cities, small organizations; teams and clubs; families; and the like. A social media tool may allow free communication a plurality of users. The social media tool may lack the database gathering and maintenance headaches of the mass notification system, but the social media tool may not provide escalation, acknowledgement (confirmation of receipt), dynamic segmentation and other features used by the mass notification system, and which are necessary for effective urgent or emergency notification.

Channels

Users may establish one or more "channels" that facilitate interaction among groups, including mass notification. Users may subscribe to a channel and receive broadcasted messages without revealing any private addresses, personal contact information, their real name, etc. Users allowed to broadcast on a channel may thereby be enabled to interact with an unlimited audience without knowing any of the subscribers' private addresses, personal contact information, phone numbers, email address, real names, etc. Interaction data sent or posted to the channel may be forwarded or "broadcasted" to one or more subscribers of that channel in a plurality of ways, including via an application, email, SMS, IM, phone calls, postal mail, and the like. Broadcasted messages may be in a plurality of formats, including recorded voice, live voice, text, video, announcements, requests, questions, prompts, and the like. Subscribers may automatically allow channel interactions to be received without an access code. The subscribers may be able to select how they receive channel messages, and may respond to messages using the same or a different method. Channel administrators and/or subscribers may be able to send interaction requests to other subscribers of a channel individually, to access information about other subscribers, and the like.

Subscribing to Channels

Channels may be hosted by the interaction server and/or channels may be hosted by a separate server and/or entity. Users having accounts with the interaction server may subscribe to channels hosted by the interaction server and/or to channels hosted remotely. The interaction server may include an API that allows a remote channel hosted by a separate server to broadcast messages to users who have accounts with the interaction server and who have subscribed to the remote channel. In some embodiments, the interaction server may authenticate the separate server using the API and route received messages to the user's message center. When the user subscribes to a channel, the user's private data and/or a trusted list for the user may be updated to reflect the subscription. The interaction server may reject interaction requests from a channel to which the user is not subscribed and/or may notify the channel that the user is not subscribed, such as by sending a bounce message.

A channel may request or require access to certain private addresses or other data when a user seeks to subscribe to the channel (e.g., requesting access to a postal address when attempting to subscribe to a wedding channel set up by a couple to be wed). The requested information may be made available to a channel administrator and/or other subscribers, such as by creating a directory from the requested information, and the user seeking to subscribe may be informed prior to subscribing of who will have access. Admission rules may determine what information is requested or required and any other criteria for admission, such as location, family relation, team affiliation, age limit, parental permission, a limitation on the number of subscribers, answering a security question, possessing a password, and/or the like. For example, a parent attempting to subscribe to a channel for their child's classroom at school may be required to provide their name, their child's name, a password, confirmation data, such as their child's birth date, and/or the like. A channel may be configured to automatically approve all subscribers satisfying the admission rules and/or to require the channel administrator's permission before approving subscribers. The channel administrator may also remove subscribers.

Each subscriber may set their own interaction rules, which may be similar to the interaction rules for receiving non-channel interaction requests. For example, the interaction rules may include which devices should receive the messages, whether the channel has emergency rights, how urgent messages should be handled including the frequency and order in which additional devices or users should receive the message, blackout periods in which messages may be blocked or held until the end of the blackout period, and the like. A subscriber may set custom rules for a channel or use default rules. The interaction server may request acknowledgement of receipt of the message and/or attempt to confirm delivery was achieved. The interaction rules may determine how unacknowledged messages should be handled. For example, some users may not permit a message to be escalated even if it is never acknowledged. Users may stop subscribing to a channel or change their rules at will.

Some channels may allow users to subscribe to the channel with just an email address, SMS number, phone number, and/or the like, without explicitly creating an account with the interaction server. A channel administrator may add and/or invite subscribers to a channel individually or from lists or directories or the like. An application may provide access to an electronic directory or other applications to facilitate the process of inviting subscribers. Users may be notified that they have been invited to subscribe to a channel. Non-users may also be invited to subscribe to a channel by sending the non-user a button or link in an email message, for example, or by providing the channel name to the non-user and inviting them to search for it online or through an application. A provisional and/or temporary account may be created that enables non-users to subscribe to channels, with or without any action on the part of the non-user. By this method all subscribers may receive broadcasts whether through their account, email address, SMS, phone, and/or the like. Provisional subscribers may respond to broadcasts, be counted as part of reporting statistics for the channel, etc. Provisional subscribers may convert their provisional account to a permanent account, and may be provided with a means to merge multiple provisional accounts into a single permanent account.

Users may be automatically subscribed to certain channels, such as a local Amber Alert channel, or when the user enters a predetermined area, for example. Users may be able to stop subscribing to channels in which they are no longer interested or channels to which they were automatically subscribed, or prevent some or all future automatic subscriptions. Users may be able to create multiple channels. Each channel may have a web page and/or web presence that may be made available to subscribers and/or the public, through which visitors may learn about the channel, subscribe to the channel, receive broadcasts, respond to broadcasts, see past broadcasts, see statistics or other information related to the channel, download related files, see related video or hear related audio, etc. Channels may be found by direct link, search, browsing, and the like.

Broadcasting

Broadcasts may be initiated by authorized users and others in a plurality of ways, such as through an application or API, from a text message, email, or phone call, or through any other form of interaction. Channels may have a designated email or other address, where any message received at that address is automatically broadcast on the channel. Subscribers may be permitted to respond to broadcasts, wherein their response may or may not be broadcast on the channel. Some channels may permit important, urgent, and/or emergency messages to be broadcasted to subscribers. Messages indicated as urgent may trigger the subscriber's rules for delivery of urgent messages, which may be enabled/disabled and/or customized for each channel subscribed to. For example, urgent messages may be escalated until an acknowledgement or confirmation is received. As with urgent one-to-one interactions, urgent channel messages may be escalated in several ways, such as attempting multiple devices, repeatedly attempting the same devices, using multiple mediums, making sequential or simultaneous attempts, alerting other users within the vicinity, alerting multiple recipients until acknowledged, etc. Subscribers may also snooze messages to delay escalation. The subscriber may send a confirmation or acknowledgement message to the interaction server to end escalation. The interaction server may provide a confirmation or acknowledgement, or indicate a lack thereof, to the sender of the broadcast, the administrator(s) of the channel, etc.

Some channels may allow all subscribers to broadcast messages to some or all other subscribers, and other channels may allow only certain subscribers and/or a channel administrator to broadcast messages on the channel. Some or all subscribers may be able to escalate messages back to the channel administrator and/or other channel subscribers. Messages received by a channel from subscribers may be allocated and/or assigned for handling as described above. Channels may be permanent, such as for clubs, families, associations, companies, departments, schools, municipalities, and the like, or channels may be temporary, such as for teams, classes, weddings, and the like. Channels may be used to initiate audio or video conference calls, including dialing out to subscribers or allowing them to dial in. Channels may also be used as chat rooms or to instantly query and receive responses from large groups of people, such as to receive votes or answers on a live television show or at a stadium. Channels may support question and answer formats such as yes or no, multiple choice, fill in the blank, open-ended, and the like, and may provide real-time statistics to the channel administrator and/or broadcaster. Channels may facilitate two-way interaction between a broadcaster and recipients via multiple methods of interaction, including text, voice, video, and the like, which may be useful for small groups such as families, teams, clubs, classes, and the like. Channel interactions may be recorded or monitored. Some channels may require a paid subscription, and the subscription status may be confirmed before a message is transmitted to a subscriber.

Channels may be used for broadcasting newsfeeds, newsletters, blogs, podcasts, and the like. Broadcasted messages may include attachments, which may be opened by subscribers. Subscribers may have readers and/or multimedia players with which they receive and interact with messages sent by the channel. Subscribers may be able to retrieve data from the channel, such as private channel data, private data from other subscribers, private data from a channel administrator, and/or the like. The purpose of a channel may be to allow subscribers to access private data.

Channels may be used to create directories of subscribers. For example, any subscriber to a directory channel may be able to interact with any other subscriber. The directory channel may be set up by a school, such as for students; a city; a state; a country; and/or the like. The directory channel may place restrictions on the types of interaction allowed, such as only permitting non-urgent, written messages, and/or may require subscribers to reveal predetermined contact information and/or to allow certain types of interactions from other subscribers. The directory channel may specify the number of trust denials permitted before a subscriber can no longer interact with other subscribers, specify parameters for crowd-sourcing of trusting, and/or the like to protect subscribers from unwanted communications.

A subscriber may also specify rules for how other subscribers to the directory channel may interact with the subscriber including types of interaction permitted; limits on the geographic area of subscribers from which interactions are permitted; filtering all interactions from the directory channel to a particular folder, label, and/or mailbox; and/or the like. The subscriber's rules for the directory channel may blacklist and/or whitelist particular users, groups of users, categories of users, such as merchant that fit the subscriber's profile/interests, geographies of users, etc. The subscriber may unsubscribe from the directory channel and/or may block all interactions from subscribers to the directory channel. The subscriber may choose to have a trust status for an individual user override rules for a group of users comprising the individual user, and/or the subscriber may choose to be prompted if a conflict arises.

Channels may also allow subscribers to interact with shared data. For example, a pot-luck-style channel may include a list of items that subscribers may take or sign up for on a first-come, first-serve basis (e.g., a list of dinner items for a pot-luck dinner). Channels may have calendaring capabilities, including integrated calendars and/or linked calendars from other channels or calendaring systems. Broadcasted messages may have calendaring elements, including the ability for subscribers to auto-insert events into calendaring systems. Notifications may be triggered automatically when administrators add new events. The administrator may trigger a broadcast by tapping on or editing a calendar event. Linked channel events may have scheduled reminders, which may be escalated, snoozed, dismissed, acknowledged, and the like.

Dynamic Segmentation

Channels may also allow for dynamic segmentation of subscribers to enable broadcasting a message to only a subset of subscribers. For example, when sending a message, a broadcaster may select criteria and the message may be automatically sent only to the subscribers satisfying the criteria. The criteria may include private information that is known to the interaction server but not the broadcaster. For example, the criteria may specify that a message is intended only for recipients over the age of 50, even though the channel administrator has no way to determine which subscribers fit that criterion. Criteria may include location (e.g., an evacuation order to people currently located in a certain area or with a registered address in a certain area), zone including group and/or sub-group, age, gender, new/recent subscribers (e.g., users that began subscribing to the channel within a specified time limit), subscribers with a particular profile or product interest, and the like. The broadcaster may not need to pre-segregate the subscribers into groups before specifying the criteria. In the event that the broadcaster sends a message based on conditions for which some subscribers have not specified relevant data, those subscribers may be notified that they may have missed channel messages because information was missing from their profile or preferences. Once the appropriate information is entered, then the original communication may pass through to the subscriber.

Mail Merge

Channels may provide mail merge-type functionality to broadcasters. A broadcaster may be able to merge data from a database, list, or the like into a message. For example, a broadcaster may type "Dear {$NAME}," to reference a name field and populate each message with the name of the intended recipient. The data may include private data of the subscribers stored on the interaction server. In an embodiment, the broadcaster may merge data to which she does not have access, and she may not be permitted to see the messages produced by the merge process. Alternatively, the broadcaster may need rights to the private data to merge it into a message, and the broadcaster may be prompted to determine if she wants to request the data from subscribers that do not allow her access. More sensitive information (e.g., payment information) may be prohibited by the interaction server and/or the subscribers from being merged and/or may require a subscriber permission before being merged, while less sensitive information (e.g., first name) may be merged and/or may not require permission. An application used to compose the message may display a list of available fields, and/or indicate fields for which merging is prohibited or permission is required.

Automatic Messages

Automatic messages may be sent by channels and/or to individual users. For example, automatic messages may be sent at predetermined times as a reminder or alert for a scheduled event (e.g., a birthday or anniversary, a reminder to vote, a reminder to change an air filter, etc.), or automatic messages may be sent when a predetermined condition occurs (e.g., a server crashes, a stock hits a certain price, a pedophile moves nearby, a desired item becomes available for sale on a website, a temperature that is being monitored reaches a certain threshold, a message is received from a predetermined user, any type of alarm or alert is triggered, or the like). The interaction server may receive, retrieve, and/or compute data, which it uses to determine if the predetermined condition has occurred. The condition data may be retrieved from email, calendar, data providers/servers, file servers, databases, websites, web services, APIs, the message center, other channels, and the like. For example, an aggregator promo channel may forward promotions from the channels of individual retailers. Automatic channel messages may also be combined with dynamic segmentation to send smart messages to subscribers matching certain criteria. For example, an automotive services chain may automatically send messages to users within a radius of a service center letting them know that an oil change is required. The date of the most recent oil change may be saved by the interaction server and/or the automotive services chain to determine which users are in need of an oil change. Automated mechanisms may be used for broadcasting communications on channels. Automated servers may interact directly with the interaction server utilizing web services or API's or the like, eliminating the need for direct human interaction in sending messages.

Location-Aware Messages

The interaction server may use location data in processing channel messages and/or one-to-one interaction requests. For example, the interaction server may receive location data from users, such as location data determined from a Global Positioning System (GPS) receiver on a client device. An interaction request may indicate that delivery of the message should be delayed until the intended recipient enters a predetermined area, such as coming within a predetermined distance of the delivery location. Channel messages may be filtered by location and/or automatically delivered upon entering a predetermined area (e.g., an emergency evacuation order, an advertisement from a local business, or the like). For example, a chain store may be opening a new location. Customers may subscribe to the chain store on a channel, but they may desire not to give their addresses to the chain store. The interaction server may allow the chain store to send a message advertising the new store to all subscribers with addresses near the new store and/or whose GPS location comes within a certain proximity of the store within a predetermined time period. The interaction server may use user-defined rules or other criteria to select which client devices should receive interaction requests based on received location data. The subscriber's location and/or direction and/or speed of travel may be taken into consideration when determining when to send the message. For example, a local coffee shop may wish to broadcast a promotion on a new product when subscribers are approaching and will arrive at approximately 60 seconds.

A user may be requested to sign in to the interaction server when they enter the range of or connect to a WiFi network (e.g., a WiFi network at a coffee shop or hotel). Then, even if the user has disabled location-aware capabilities, such as GPS, the user may be notified of emergencies at their location, and/or the user's interaction rules may allow for intelligent interaction request routing based on the location. A provisional and/or temporary account may be created for persons not having an account.

Blind Mailing Service

Users' private addresses may include one or more postal addresses. Users may wish to receive postal mail without divulging an address and/or a broadcaster may wish to send postal mail without having to gather or maintain a database of addresses. A sender may transmit an electronic message to the interaction server intended as postal mail for one or more recipients without the sender possessing the postal address of the recipient(s). The interaction server may determine postal addresses for the intended recipient(s). If the interaction request specifies a zone for the recipient(s) and/or sender, the interaction server may determine the appropriate "to" and/or "from" address and other branding, labeling, etc. to use to send the item (e.g., choosing a work address or a home address). The interaction server may comprise one or more apparatuses configured to print the message, print correctly addressed envelopes with proper postage, and stuff the envelopes for mailing. The interaction server may allow the sender to select first class postage, priority postage, overnight postage, or the like. The one or more apparatuses may also be configured to label and/or stuff envelopes and/or boxes for physical goods that are received by the blind mailing service. In an embodiment, the interaction server may send blind mail without using an apparatus by transmitting or otherwise providing access to all necessary information to a third party for fulfillment.

For a user to receive physical "blind" mail or a "blind" package (where the sender does not know the postal address of the receiver) that did not originate as an electronic message, the item may be addressed to the user's public address and sent to a central processing location. A bar code, QR code, and/or the like may be used to facilitate routing. Once the item is received at the central processing location, the sender is authenticated, and the rules for the intended recipient allow receipt of the item from that sender, the interaction server may be queried for the postal address of the intended recipient and the item may be mailed or shipped to its final destination. Thus, "blind" mailing of physical items may be achieved, whereby the sender need not know the recipient's actual postal address, and the receiver need not divulge it. Alternatively, a mailing or shipping provider, such as the US Postal Service, may be provided with tools and/or access to the interaction server to authenticate senders and retrieve address information for receivers. Thus, the shipping provider may provide seamless blind mailing service, negating the need for items to be mailed or shipped twice (first to a central processing location and then to the final destination).

Dashboard

A channel administrator and/or message broadcaster may be able to view or receive channel-related data through a search, a dashboard, summary reports, real-time reports, a ticker or banner, alerts, notifications, and the like. The channel-related data may include real time statistics, historical statistics, the percentage of users acknowledging receipt of the message, the number of subscribers, new subscribers, past subscribers, past notifications, responses, attachments, and the like. The channel-related data may also include statistics fitting pre-defined or custom criteria, such as subscribers over a certain age, of a certain sex, married, living within a specified area, with a specific product interest, answering a question in a certain manner, and the like. The interaction rules for each user may specify how much of that user's information may be revealed in the channel-related data.

Reverse-Search Shopping

Prior to the present disclosure, online shopping models were not very helpful for localized shopping and often too costly and time-consuming for local sellers when considering all the expenses involved in building a website, initiating pay-per-click and/or search engine optimization campaigns to drive traffic to the site, writing blogs, creating videos, keeping the website current, etc. As a result, rather than utilizing online shopping, shoppers may have ended up driving to a store, calling a store, and/or looking through the classifieds to find items they may purchase locally. It would be advantageous for local sellers to communicate directly and individually with interested, local shoppers at a low cost, without requiring the creation of a website. The interaction server may allow shoppers to interact directly and anonymously with sellers without visiting the seller's website, driving anywhere, divulging contact information, and/or needing to know the seller's phone number or web address. Further, the seller may pay for the service only when directly interacting with a shopper. In addition, the interaction server may allow for securely entering into agreements and/or making payments.

In some embodiments, sellers may bid on bid words by indicating an amount they are willing to pay when a shopper initiates interaction. Sellers may also or instead create a list of bid words by uploading or providing real-time access to a product inventory and/or other data. The shopper may post what the shopper is shopping for to the interaction server. The shopper may request matches in certain locations, such as within a certain radius of the shopper's location. The interaction server may return a list of matching products by comparing the bid words to the post and/or by comparing the seller's location to the locations specified by the shopper. The highest bidding seller may be listed first. Shoppers may also be able to search and sort results based on ratings from third party websites. The shopper may click a listing to view additional information (e.g., seller information, product ratings by third parties, and/or the like), including pictures, videos, descriptions, advertising, helpful information, or the like, which may be available through the interaction server and/or through another site. The shopper may anonymously initiate interaction with the seller via text, chat, voice, video, and/or the like. The seller may not be charged until interaction is initiated. If a shopper's post does not result in any matches, the interaction server may save the post until a seller bids for a matching bid word. The shopper may then be alerted to the match. A shopper may also choose to save a post. The saved post may enable additional results to accumulate and additional sellers to find the shopper. Alternatively or in addition, sellers may manually search for posts and advertise to those shoppers. Sellers may also be alerted when a shopper's posts match their bid word(s), but they may not be able to initiate interaction with the shopper.

Interaction requests from shoppers may be answered by the seller and/or others, such as sales clerks. The shopper may specify a generic method of interaction, and the seller may select a specific method of interaction and/or device for interacting. For example, the shopper may specify a voice communication and the seller may choose to escalate the communication starting with the office phone, then a mobile phone, etc., until the communication is answered. The shopper and/or the seller may reveal their public addresses, their private addresses, both, or neither. The shopper may wish to always interact anonymously with sellers, while sellers may wish to always reveal as much as possible. For example, within a communication the shopper may be heard by the seller in a voice call or the seller may receive the shopper's written communication without the shopper revealing any private or public addresses, while the seller is both seen and heard by the shopper via video conference. The seller may not need a website or to reveal a phone number to interact with the shopper. Instead, the seller may have just a phone and/or a computer. An app on the phone or computer may be used for interaction in some embodiments. If the seller does have a website, the app may also allow the seller to interact with visitors to the website. For video conferencing, the seller may show the store, themselves, product/model in which the shopper is interested, and/or the like, while the shopper may elect not to display video or otherwise identify themselves. The interaction server may manage payment (detailed below), such as a down payment or full payment, including escrowing the payment and maintaining a paper trail. The interaction server may also save a copy of any agreements between the seller and shopper. Shoppers and sellers may be able to submit ratings of each other to the interaction server once the transaction is complete.

Payments

The interaction server may also be used to facilitate payments between and among users and non-users. Payers and/or payees may not be required to reveal payment and/or private information (such as a user's name, email address, phone number, credit card number, bank account number, etc.) to one another. Transactions may not require merchant capabilities, such as Point-of-Sale capabilities. As a result, users may quickly and easily make and/or receive payments, whether to or from other users or non-users, and untrustworthy users may be prevented from receiving unauthorized payments. For example, a potential payee may send a payment request that specifies the amount of money requested, a desired payer, a desired payment type (e.g., credit, check, etc.), and/or the like to the interaction server. The payment request may be sent via an application, through email to a specific address, through an automated teller, via touch-tone phone, and the like. The payee may use a location-aware app that automatically suggests payers in the area with whom the transaction may be intended. Once the payment request is made, the payer may receive notification of the payment request, decide whether to approve the transaction, and/or designate a payment source, amount, category, description, etc. Similarly, a transaction may be initiated by a payer attempting to send payment to a payee. For a payer-initiated transaction, the payer may designate the amount, source, category, description, etc.; specify the desired payee (for example by selecting from a location-aware-generated list of nearby payees, such as the store the payer is standing in); and initiate payment. The payee may receive the payment attempt and may then apply it to an agreement, invoice, purchase order, etc.; deposit it to a particular account; forward it to another payee; reject the payment; and the like.

The payee may include a generic indication of a desired or required payment source (e.g., the payee may prefer funds from a checking account or may prefer payment by credit cards). The payer may select a specific payment source when responding to a payment request. Personal payment and account information for various sources may be saved on the interaction server. Personal payment information may include credit card numbers, electronic check information (e.g., routing number and account number), access and/or addresses for online payment services, and the like. If the request is approved by the payer, the interaction server may submit a request for the specified amount of money to a payment processing system associated with the payment source specified by the payer, such as the Automated Clearing House (ACH), a credit card processing system, and/or the like. Alternatively or in addition, indications of account balances for accounts managed by the interaction server may be updated based on the transaction and may be supplied to the user(s). After a payment is completed, a receipt or other summary of interaction history may be saved to a storage device within the interaction server, on a separate storage medium, or the like and may be made available to one or more parties to the transaction and/or other desired parties.

Parties to a transaction may select the level of user authentication required. For example, before releasing payment a payer may require that a payee re-login to their user account, answer one or more security questions, pass through biometric security, receive a form of third-party validation, and the like. Before the user is permitted to utilize payment and/or agreement functionalities, extended validation may be performed to confirm a user's identity and prevent identity theft. Extended validation may include vouching by a highly trusted user, a credit check, receipt of a notarized letter, or the like. Users may not be permitted to save their passwords and/or may need to select longer and/or more secure passwords than normal if they are using payment and/or agreement functionalities.

A payment request may be sent as a telephone call, text message, email, notification via an application operable on a smartphone, tablet, personal computer (PC), or the like. An authorization response may be made by touching keys during the telephone call, sending a responsive text message or email, responding via a smartphone app, submitting a response using a website, voice recognition or other biometric authentication, or the like. A pin and/or password and/or other authentication information and/or process may be required to authorize the interaction. The payer may specify approved payees who are automatically approved and/or may individually approve or deny payment requests for payees that are not approved. A payer may pre-authorize a specific or maximum amount to be paid to a particular payee, for a particular period of time, or within a particular area. For example, to save time at checkout a payer may pre-authorize up to $50 to be charged by a store he or she may be shopping in, and that authorization may last for only an hour.

A payer's ability to pay may be similarly limited by a parentally linked account or an associated zone. For example, a child may be pre-authorized by a parent to spend only a maximum of $20 and only to a specified payee or category of payees, within a certain distance from home, from only a specified account, for a specified window of time, and the like. Likewise, an employee may be pre-authorized through his or her associated zone to spend a certain amount of money entertaining clients, only to specified payees or categories of payees, only from specified accounts, within only a specified window of time, etc.

A user may attempt to pay or request payment from a user or non-user. The non-user may receive an email or other message informing them of the request. The non-user may be invited to respond to and/or complete the transaction with or without creating a user account. The non-user may complete the transaction by making payment in any way, such as cash, check, credit or debit card, establishing a user account, authorizing the transaction with their financial institution through any number of means, and the like. The user may receive notification if the transaction was completed or rejected electronically, or the user may manually notate the transaction record as to how the transaction was completed. A permanent record of the transaction and all associated events may be stored within the interaction server, and copies, receipts, and/or other information may be made available to involved parties.

In some embodiments, the interaction server may optionally act as an escrow agent for the transaction. Payment settings specified by the payer and/or the response to the payment request may determine whether the interaction server acts as an intermediary. When the interaction server acts as an intermediary, the payer may keep their payment information private and need only provide the public address. Also, the payer may keep their personal contact information private to allow for anonymous payments. For escrow payments, the request for the specified amount of money sent to the payment processing system may designate the interaction server as the recipient of the funds. The interaction server may also initiate and/or approve a second transaction to transfer funds to the payee from a source affiliated with the interaction server.

Alternatively or in addition, the payer may give payment information to the payee, and the interaction server may control transactions attempted with that payment information. For example, a merchant may attempt to submit a charge on a credit card. The charge may be automatically denied by the payer's bank. The payer's bank may notify the payer via the interaction server of the attempted charge and/or denial. The payer may send a response approving the charge. Then, the merchant may attempt to submit the charge again, and the charge may process successfully. Alternatively, the merchant may attempt to submit the charge a first time, and the charge may not be approved or denied until a response is received from the payer. In an embodiment, the payer may pre-authorize the merchant for a specific or maximum dollar amount. The pre-authorization may have time, location, specified merchant, and/or other limits. As a backup, charges requiring a PIN, such as charges to a debit card, may be allowed without a response from the payer. The interaction server may save a copy of all payment requests, authorization responses, charge approvals, and the like to provide a paper trail.

The interaction server may allow a user to use their smartphone, tablet, and/or other similar device as a Point-of-Sale device. A user may avoid waiting in merchant checkout lines by using an application running on their smartphone to scan the barcode, QR code, and/or the like of a desired item and add it to an electronic shopping cart and/or complete the purchase immediately. An electronic or printed proof of purchase, receipt, and/or the like may be printed, displayed, stored, or otherwise made available to both buyer and seller by the interaction server. Near-field-communications (NFC), GPS, and/or other location-aware and wireless technologies may enable the user, carrying the smartphone or other device used in the transaction and possessing the proof of purchase, to exit a store without triggering theft detection devices and without the intervention of a store clerk, checkout line, etc.

Agreements

The interaction server may also be used in negotiating and executing agreements. Users may wish to agree to a contract of which a permanent record is kept, and/or one or more users may want approval of an action before that action is undertaken. A storage device may save agreements and/or indications of approval. A first user may send an agreement request to the interaction server including a written agreement or a description of an action for which approval is requested. The agreement request may be forwarded to the second user by the interaction server for authorization. Once the agreement request is authorized by the second user or authorized by both users, the interaction server may save the agreement request and the time and date of each authorization to the storage device as a temporary or permanent record of the agreement. The interaction server may make the agreement and/or a receipt available to both users. The same process may work for more than two parties to an agreement, or where multiple approvals are necessary before an action is undertaken.

Users may be able to make changes to an agreement prior to agreeing, and a time-stamped history of the changes may be saved on the storage device. Exemplary uses of agreements may include an auto mechanic seeking approval to do additional work on a vehicle, or two parties conducting a private sale of a used vehicle. Also, credit providers and/or agencies may request authorization before opening a new credit account to prevent identity theft. The credit provider and/or a credit reporting agency may request authorization to open the account. The interaction server may make templates available to the parties for creating the agreements, such as a bill of sale template for sale of a vehicle, a letter of undertaking, an I owe you ("IOU"), or the like. For parties without an account with the interaction server, a provisional account may be created automatically. The provisional account holder may be sent a link that allows them to manipulate the agreement and interact with the counter party without signing up for a full account. The agreement may be printed and signed once the parties have finished manipulation.

Parties to an agreement may select the level of user authentication required prior to finalization and/or execution of the agreement. For example, one party may require that another party re-login to their user account, answer one or more security questions the interaction server, pass through a biometric form of security, receive a form of third-party validation, meet in person, review identification, and the like.

Web Presence

The interaction server may also store personal and other data on a storage device, and the data may be available as a web presence. The data may be available over a public medium but access to the data may be restricted. An entity may submit an interaction request specifying data desired from a user. The user may allow certain trusted senders and/or access codes to access the data automatically. The user may also or instead require their authorization/approval before the data is shared. If the requested data is not stored on the storage device, the interaction server may prompt the user to provide the information. The data may include shipping and/or billing addresses, personal health records, demographic information, personal contact information, advertising preferences, browsing preferences, authentication data, answers to questions, and/or the like. The user may also authorize an entity to append and/or add new data to the user's web presence.

For example, addresses and health records may be accessible to entities needing such information. A magazine or newspaper publisher may verify a subscriber's address before sending each new publication. A health provider may download patients' health records, query patients for new information, and/or append new information to the record. Moreover, the user may select entities to receive automatic updates of the information. When an address is updated at the storage device, that update may be immediately available and/or accessible to newspaper and magazine publishers with which a subscription is held, banks with which an account is held, friends and family, and the like.

The interaction server may manage directories of contacts or other information shared by the user with other users. Changes to shared private contact information may be immediately visible to other shared and/or trusted users, and/or the new changes may automatically propagate to the shared directories. For personal health records, the user may update a personal health record with new symptoms or the like, and the updated personal health records may be immediately available to a doctor. The doctor may also submit interaction requests to the user, such as medical questions, which are appended to the personal health records along with the answers to the questions. Some entities may be given access rights to modify private data and/or may be able to submit a request to update the private data. Thus, a hospital with access rights may update personal health records, and that update may be transmitted to other hospitals or health providers selected by the user.

Profile, Interests, & Safe Browsing

Users may maintain a profile within the interaction server that may be made available to advertisers. The profile may include advertising preferences, product interests, demographic information, location information, user-selected interests, browsing preferences, and the like. As a user browses the internet, a browser, cookie, browser plug-in, or the like on a client device of the user may indicate the public address for the user and thereby allow a webpage and/or advertiser to request and/or obtain profile information from the interaction server. The information may be transferred as a highly compressed preferences map. Alternatively or in addition, the user may log into an account controlled by or with access to the interaction server when the user starts browsing, and the browser may transmit the public address during a request for a webpage or other service. Thus, advertisements of interest may be shown to the user, and undesirable content, such as pornography or violence, or entire undesired websites may be blocked from view. However, no other private data needs to be revealed for the preferences to be implemented. Ads may also include one or more control buttons that allow the user to update preferences, turn off undesirable ads, and/or the like. A parent account may be able to control the advertising and browsing preferences for a child account to ensure only age-appropriate and/or parentally approved sites are visited. The profile information may be also be shared with authorized merchants, websites, and other organizations according to the user's desires. The shared information may be general information applicable to multiple websites, and/or the information may be site-specific. The user may also allow direct interaction requests from the website/organization, set limitations for interactions, and/or block interactions at will. Users may allow organizations to ask and receive answers to new questions about their profile and/or interests, append new sections and/or information to their profile, and the like.

Authentication & Account Consolidation

As an additional functionality, the interaction server may store usernames and passwords for a plurality of websites, online accounts, and/or the like. When a user visits a webpage, a form-filler may automatically fill the username and password into a login form on that webpage. Alternatively or in addition, a website may implement an application programming interface (API) through which the interaction server may authenticate the user. In an exemplary embodiment, the user may log into the interaction server, and the website may communicate with the interaction server to verify the identity of the user. The website and interaction server may communicate according to the OpenID standard, the OAuth standard, a proprietary standard, or the like. The website may direct the user to the interaction server to log in, and/or the user may log in first and be automatically authenticated when upon arrival at the website. Once authenticated, the user may utilize the website as they normally would.

Authentication and access to profile information may work synergistically to benefit both users and websites. For example, the "Runner's World" website may desire that a user create an account on their website to access desirable content and provide her profile, interests, and interaction preferences to help them market to her. While the user is an avid runner, she prefers not to create yet another online account. Instead, when visiting runnersworld.com she may log in with her interaction server account, which instantly authenticates and identifies her. The interaction server may also provide Runner's World with access to her profile and product preferences and a direct method to interact with her, which she can revoke at any time. Through her interaction server account she grants Runner's World permission to occasionally prompt her to fill out additional preferences specific to running, which preferences and answers can be reviewed and maintained within the interaction server rather than the runnersworld.com website. Thus, Runner's World gains access to valuable information about a runner and a sure method to interact with her. The user need not create yet another online account, retains her privacy and control over what private data Runner's World may have access to, and she retains ultimate control over if and/or how Runner's World may interact with her. She can now share that same information with additional merchants in the running industry, rather than maintaining accounts in multiple places.

Utilities

The interaction server may also offer cloud and collaboration services and tools. The interaction server may offer calendars, word processing, spreadsheets, presentation capabilities, flow charting, and the like to users. Users may be able to share and edit calendars and documents, collaborate, schedule events, and the like. A storage device may store calendars, documents, pictures, notes, backup files, and other files. The interaction server may allow files too large for email to be stored for sharing and/or transferred among users. The interaction server may provide language translation capabilities for interaction requests, while messages are being composed, during transmission, after receipt, and the like.

Definitions

"Interaction" is broadly defined herein and may include communication, interacting with another person's information or files, interacting with shared files or workflows, interacting via any method described in this application, or the like. "Interaction requests" may include any initialization of an interaction, by any mechanism or medium, synchronous or asynchronous, with or without a message. The term "communication" as used herein may indicate voice communication, text communication, physical mail, an electronic request for interaction, a response to a request, an entire record of a conversation or interaction, recordings, attachments, notifications, broadcasts, responses, answers, selections, and the like. "Messages" may include written text, voice messages, video messages, any data necessary to fulfill an interaction request, or the like and may be structured or unstructured.

The interaction server and/or clients may comprise a processor. Alternatively or in addition, the interaction server and/or clients may be implemented by a computer system. Embodiments may include various steps, which may be embodied in machine-executable instructions to be executed by a computer system. A computer system comprises one or more general-purpose or special-purpose computers (or other electronic devices). Alternatively, the computer system may comprise hardware components that include specific logic for performing the steps or comprise a combination of hardware, software, and/or firmware. Without limitation, a computer system may comprise a workstation, laptop computer, disconnectable mobile computer, server, mainframe, cluster, so-called "network computer" or "thin client," tablet, smartphone, personal digital assistant or other hand-held computing device, "smart" consumer electronics device or appliance, or a combination thereof. A server may include a physical server, a server cluster, a distributed server, a virtual server, a cloud server, a computer providing resources to one or more clients, a combination of one or more of the aforementioned, and/or the like. Some or all of the functions, steps, and/or operations discussed herein may be performed by one or more clients rather than the interaction server. Those of skill in the art will realize possible divisions of operations between the interaction server and the one or more clients.

Each computer system includes at least a processor and a memory; computer systems may also include various input devices and/or output devices. The processor may include one or more general-purpose central processing units (CPUs), graphic processing units (GPUs), or Digital Signal Processors (DSPs), such as Intel®, AMD®, Nvidia®, ATI®, TIC), or other "off-the-shelf" microprocessors. The processor may include a special-purpose processing device, such as ASIC, PAL, PLA, PLD, Field Programmable Gate Array (FPGA), or other customized or programmable device. The memory may include static RAM, dynamic RAM, flash memory, ROM, CD-ROM, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computers may be capable of using a floppy drive, tape drive, optical drive, magneto-optical drive, memory card reader, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Embodiments may also be provided as a computer program product, including a non-transitory machine-readable storage medium having stored thereon instructions that may be used to program a computer (or other electronic device) to perform processes described herein. The non-transitory machine-readable storage medium may include, but is not limited to, hard drives, floppy diskettes, optical disks, CD-ROMs, DVD-ROMs, ROMs, RAMs, EPROMs, EEPROMs, magnetic or optical cards, tapes, solid-state memory devices, or other types of media/machine-readable media suitable for storing electronic instructions.

Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. One suitable network includes a server and several clients; other suitable networks may contain other combinations of servers, clients, and/or peer-to-peer nodes, and a given computer may function both as a client and as a server. Each network includes at least two computer systems, such as the server and/or clients.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Suitable software to assist in implementing the invention is readily provided by those of skill in the pertinent art(s) using the teachings presented here and programming languages and tools, such as Java, Pascal, C++, C, PHP, JavaScript, Python, C#, Perl, SQL, Ruby, Shell, Visual Basic, Assembly, Action Script, Objective C, Lisp, Scala, Tcl Haskell, Scheme, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, comprise one or more physical or logical blocks of computer instructions, which may be organized as a routine, a program, a script, an object, a component, a data structure, etc., that performs one or more tasks or implements particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that may be used according to the present invention is already available, such as general-purpose computers, computer programming tools and techniques, computer networks and networking technologies, and digital storage media.

FIG. 1 is a schematic diagram of an interaction server 100 configured to enable privately public communication for a receiver 160. Senders 151, 152 may transmit interactions, such as interaction requests, to the interaction server 100. A user 152 having an account with the interaction server 100 may be one of the senders 151, 152. A sender 151, 152 may include a person, a computer acting autonomously, a computer operated by a person, and/or the like. The interaction requests may include an address and/or a public identifier (e.g., a public address), an access code, a payload (e.g., a message), and/or the like. The interaction requests may initially be processed by an authentication/identification module 102. The authentication/identification module 102 may require login credentials from the user 152 and may verify that the non-user sender 151 has not spoofed their identity. If the senders 151, 152 have been authenticated and/or identified, their interaction requests may be passed to an authorizer module 110. Otherwise, the interaction request may be rejected, deleted, flagged, and/or the like.

The authorizer module 110 may determine whether interaction requests from the senders 151, 152 are authorized for delivery to one or more user resources associated with the receiver 160. If the interaction requests are not authorized, they may be deleted (symbolically represented by trashcan 130). The authorizer module 110 may also be configured to sort interaction requests among the one or more user resources, such as one or more inboxes 121, 122. If a sender 151, 152 is on a trusted list 112, the interaction request may be sent to a trusted inbox 121. If the interaction request is otherwise authorized (e.g., has a valid access code or the interaction rules specify that all interaction requests should be sent to the receiver 160), the interaction request may be sent to an unverified inbox 122. In the illustrated embodiment, the inboxes 121, 122 are separate mailboxes. In other embodiments, all authorized interaction requests may be stored in a message center with tags, fields, and/or the like indicating whether the interaction request is from a trusted sender. In an embodiment, the unverified inbox 122 is a holding area not visible to the receiver 160, and a request for the receiver 160 to trust the sender 151, 152 may be sent to the trusted inbox 121. For a sender 151 without an account with the interaction server, a provisional account module 116 may create a provisional account before the interaction request is delivered to one of the inboxes 121, 122.

The interaction server 100 may include an interaction notification engine 120. The interaction notification engine 120 may be configured to periodically check the trusted and/or unverified inboxes 121, 122 and/or a message center to see if new interaction requests and/or messages have arrived. The interaction notification engine 120 may store or access interaction rules that it uses to determine how to handle new messages. The interaction notification engine 120 may notify the receiver 160 that a new message has arrived, escalate messages until the receiver 160 acknowledges them, do nothing, and/or the like when a new message is detected in the inboxes 121, 122. When notifying the receiver 160, the interaction notification engine 120 may include the message, a copy of the message, a preview of the message (e.g., a predetermined number of characters from the beginning of the message), a link to the message, and/or the like.

The receiver 160 may access the inboxes 121, 122 and/or a consolidated message center (not shown) to review the messages therein. When reviewing unverified messages, the receiver 160 may be prompted to determine whether a sender 151, 152 is trusted. The receiver 160 may or may not be permitted to respond to a message until a trust decision is made. The receiver 160 may be able to respond "Yes," "No," or "Maybe" when determining whether to trust a sender 151, 152. If the receiver indicates that the sender 151, 152 is trusted, the sender 151, 152 may be added to the trusted list 112 and any messages from the sender 151, 152 may be moved to the trusted inbox 121 and/or tagged, grouped, or otherwise identified as trusted. A response of "Maybe" may partially trust the sender 151, 152 and/or provide the sender 151, 152 with limited trust privileges. If the receiver 160 indicates that the sender 151, 152 is not trusted, the interaction request may be discarded. If the receiver 160 is receiving undesired messages sent with a particular access code, the receiver 160 may use an access code module 114 to disable or modify the rules for the access code. If the receiver 160 is receiving undesired messages and access codes are disabled, the receiver 160 may use the access code module 114 to enable access codes.

Some interaction requests may request acknowledgement or response. Accordingly, the receiver 160 may indicate to an acknowledgement module 140 that the message was received, and/or the receiver may provide a response to the request, such as an answer to a multiple-choice question, a yes or no, a detailed answer, and/or the like. The acknowledgement module 140 may indicate to the sender 151, 152 that the interaction request was acknowledged, and/or the module may convey a response.

Figure 2:
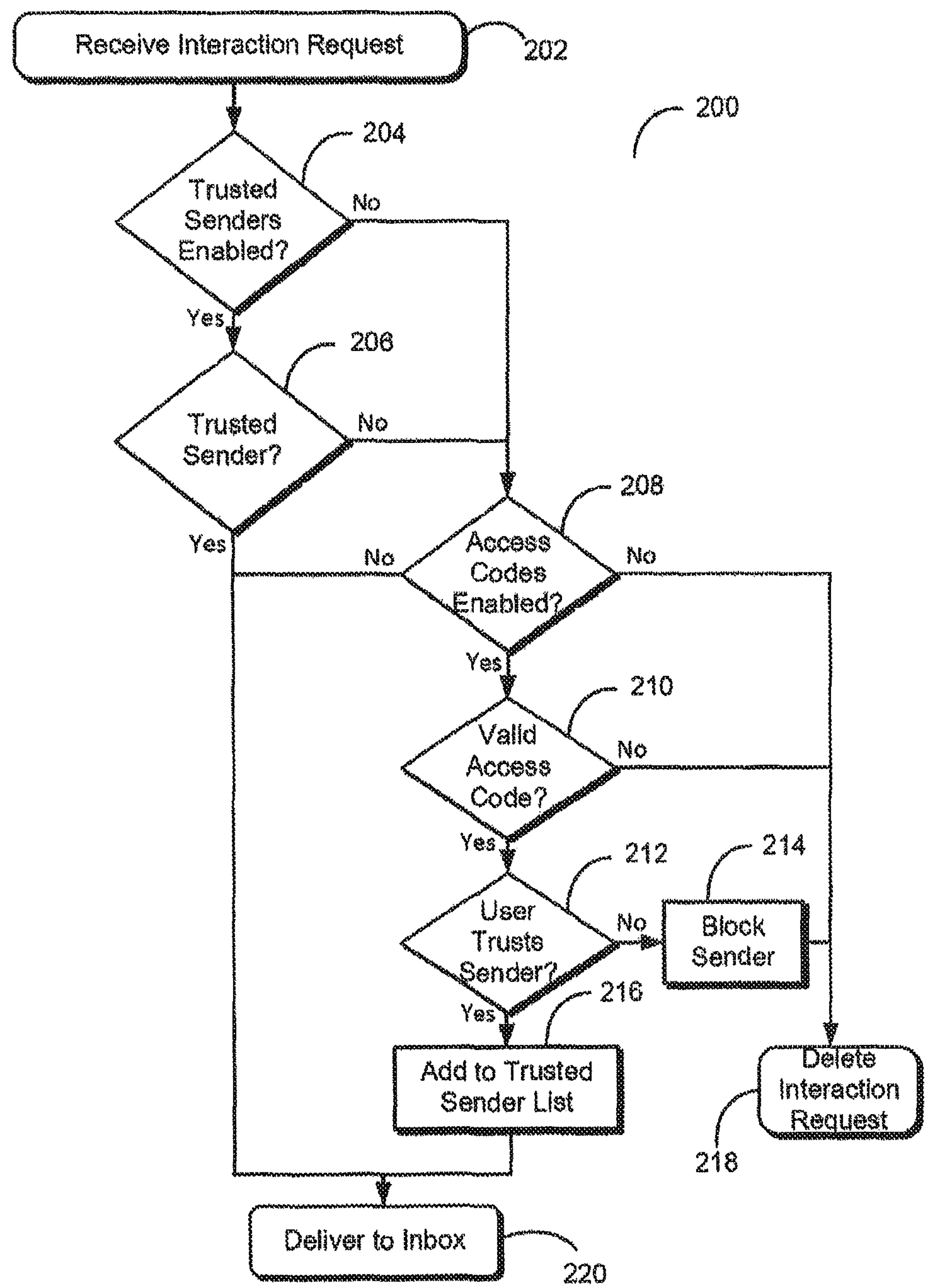
FIG. 2 is a flow diagram of a method for processing interactions received by the interaction server.

FIG. 2 is a flow diagram of a method 200 for processing interaction requests received by the interaction server 100. The method 200 may begin when the interaction server 100 receives 202 an interaction request. The interaction server 100 may determine 204 whether the receiver 160 has enabled trusting of senders. If the trusting of senders is not enabled, the interaction server 100 may proceed to step 208. Otherwise, the interaction server 100 may determine 206 whether the sender 151, 152 is trusted (e.g., determine whether the sender 151, 152 is on the trusted list 112). If the sender 151, 152 is trusted, the interaction request may be designated as trusted and/or delivered 220 to the trusted inbox 121. Otherwise, the interaction server may proceed to step 208.

At step 208, the interaction server 100 may determine if access codes are enabled. In the illustrated configuration, if access codes are not enabled, the interaction request may be delivered 220 to the inbox 121 or otherwise made available for review. Alternatively or in addition, the interaction request may be deleted if access codes are not enabled. If access codes are enabled, the interaction server 100 may determine 210 if the received access code is valid. If the received access code is not valid, the interaction request may be deleted 218. If the access code is valid, the interaction request may be designated as unverified and/or moved to the unverified inbox 122.

When the receiver 160 reviews unverified interaction requests and/or the unverified inbox 122, the receiver 160 may be prompted to specify whether the sender 151, 152 should be trusted. The interaction server 100 may receive 212 a response indicating whether the sender 151, 152 is trusted. If the receiver 160 indicates that the sender 151, 152 is not trusted, the interaction server may block 214 the sender 151, 152 from sending any future interaction requests and delete 218 the interaction request. If the receiver 160 indicates that the sender 151, 152 is trustworthy, the sender 151, 152 may be added 216 to the trusted sender list 112, and the interaction request may be designated as trusted and/or delivered 220 to the trusted inbox 121. The method 200 ends upon deletion 218 or delivery 220 of the interaction request until the next interaction request is received.

Figure 3:
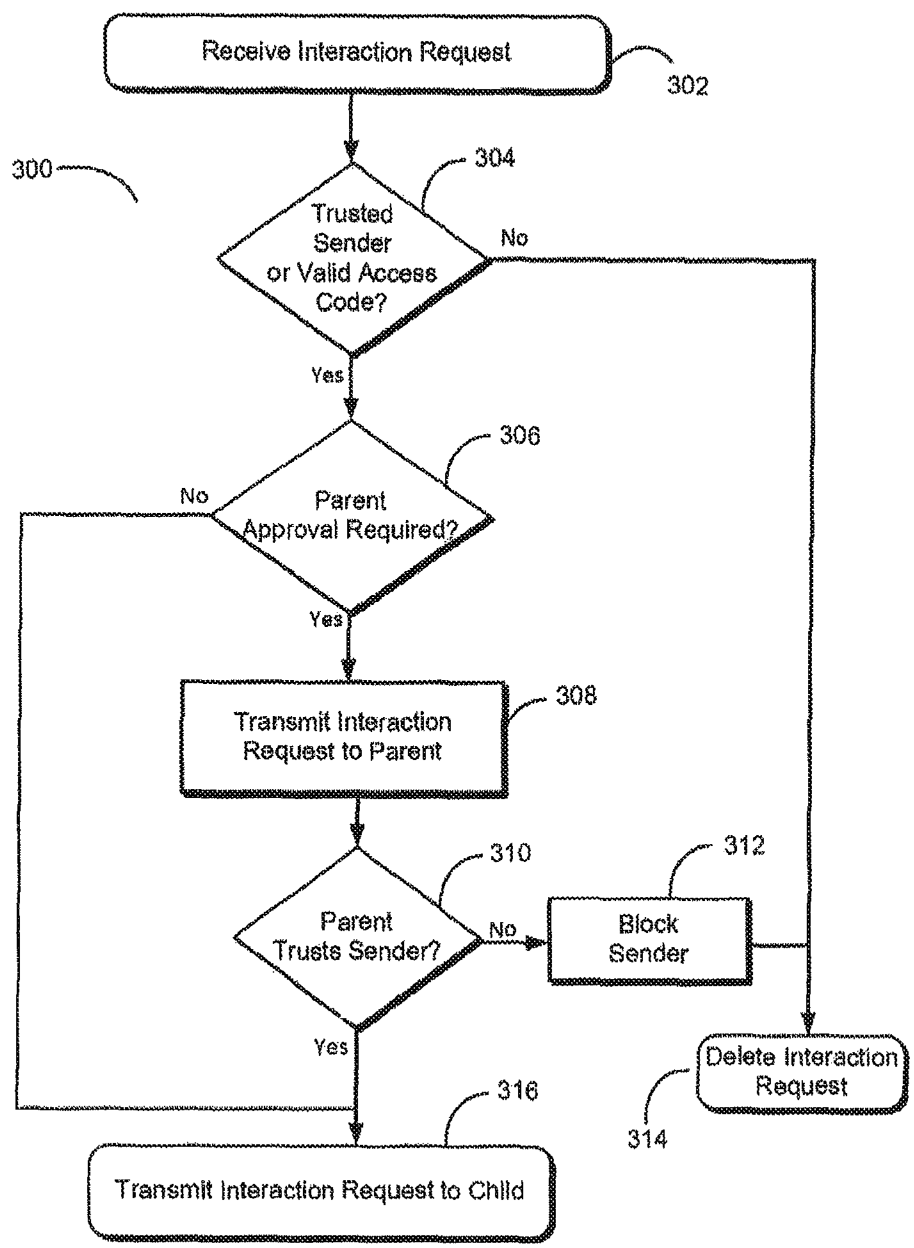
FIG. 3 is a flow diagram of a method for processing interactions addressed to a child public identifier that is linked to a parent account.

FIG. 3 is a flow diagram of a method 300 for processing interaction requests addressed to a child public address that is linked to a parent account. The method 300 may begin when the interaction server 100 receives 302 an interaction request that is addressed to a child public address. The interaction server 100 may determine 304 whether the sender 151, 152 is trusted and/or has a valid access code. If the sender 151, 152 is not trusted and/or does not have a valid access code, the interaction request may be deleted 314. Otherwise, the interaction server 100 may proceed to step 306.

At step 306, the interaction server 100 may determine whether parent approval is required. The parent may allow certain senders 151, 152 and/or access codes to transmit interaction requests to the child without parent approval. If parent approval is not required, the interaction request may be made available and/or transmitted 316 to the child. If parent approval is required, the interaction request may be made available and/or transmitted 308 to the parent for approval. The parent may review the interaction request, and the interaction server 100 may receive 310 a response indicating whether the parent trusts the sender and/or approves the interaction request. If the parent does not trust the sender, the sender may be blocked 312 and the interaction request may be deleted 314. Otherwise, the interaction request may be made available and/or transmitted 316 to the child. If the parent trusts the sender, the parent may indicate to the interaction server 100 that future messages do not require approval or may indicate that all future messages should be reviewed by the parent before delivery.

Figure 4:
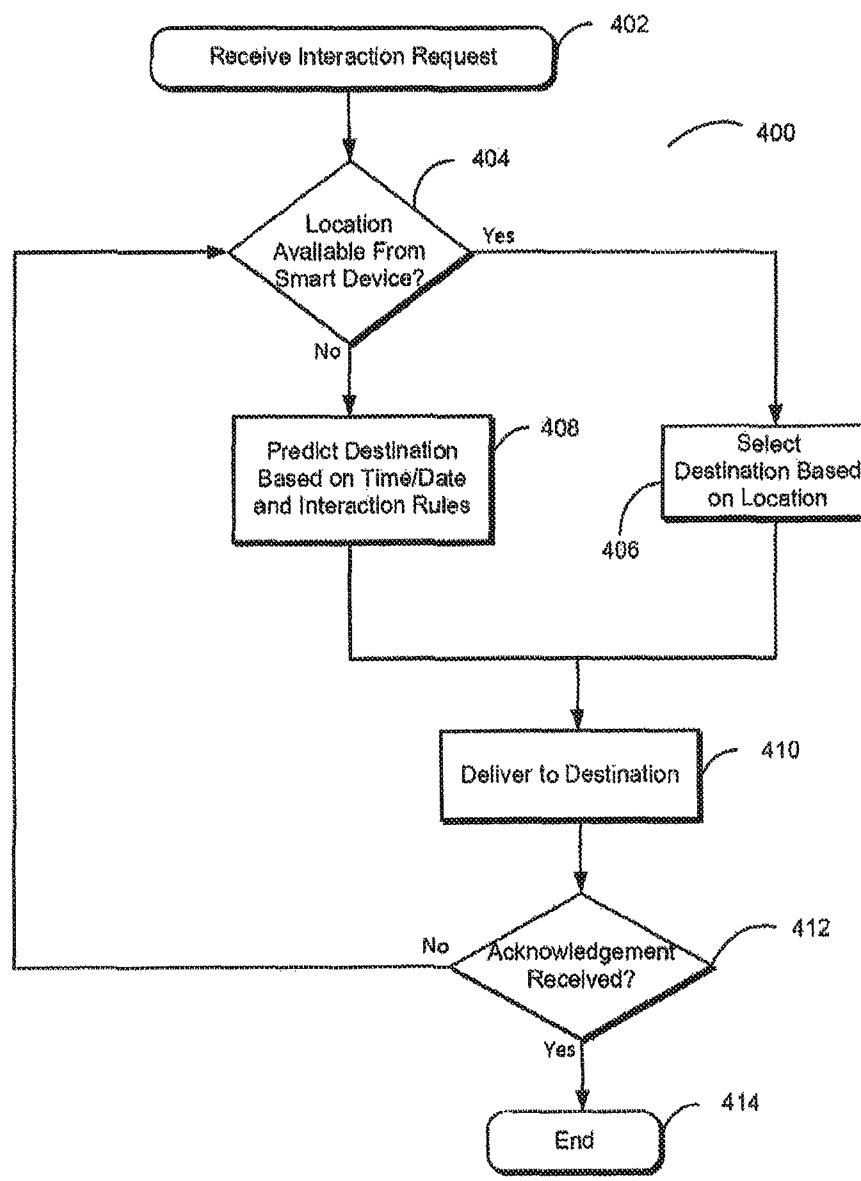
FIG. 4 is a flow diagram of a method for delivering an interaction to a user resource of a receiver using location-based interaction rules.

FIG. 4 is a flow diagram of a method 400 for delivering an interaction request to the receiver 160 using location-based interaction rules. The method 400 may begin when an interaction request is received 402 by the interaction server 100. The interaction server 100 may determine 404 whether a location (e.g., a GPS location) for the intended receiver 160 is available. The interaction server 100 may also or instead determine whether the intended receiver has logged into a computer or performed other activities from which location data can be leveraged.

If a location is available, the interaction server 100 may use the location to select 406 a destination for the interaction request. If no location is available, the interaction server 100 may use the current time of day, current day of the week, and/or the like and/or the interaction rules to predict 408 the destination most likely to reach the receiver 160. The interaction rules may be learned based on past behavior of the receiver 160. The interaction server 100 may deliver 410 the interaction request to the selected and/or predicted destination.

For interaction requests requiring acknowledgement, the interaction server 100 may determine 412 whether acknowledgement of the interaction request was received. If no acknowledgement is received, the interaction server may return to step 404. The interaction server 100 may expand the number of destinations selected and/or predicted with each iteration. If an acknowledgement was received, the method may end 414.

Figure 5:
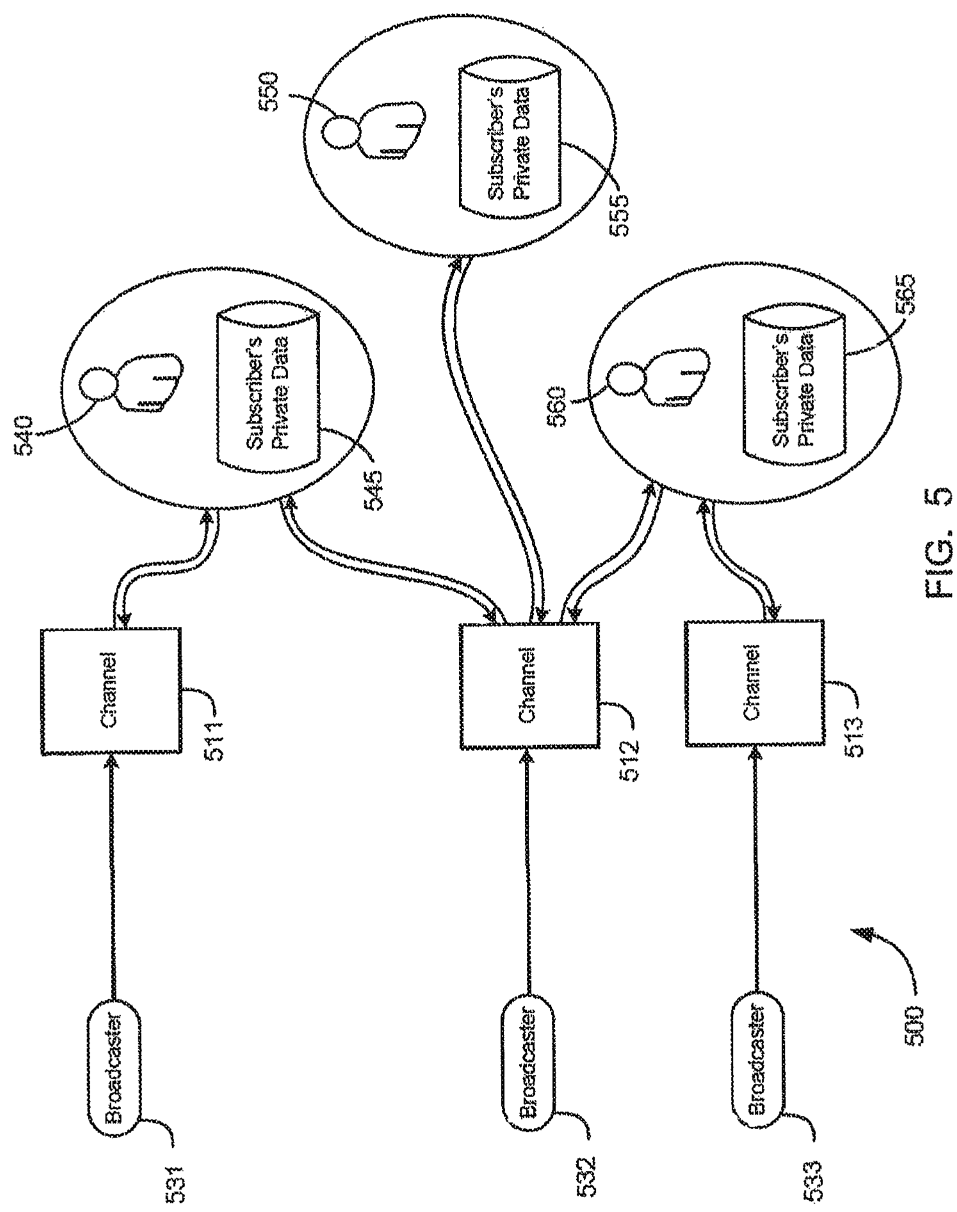
FIG. 5 is a schematic diagram of a system configured to broadcast messages to a plurality of channel subscribers.

FIG. 5 is a schematic diagram of a system 500 configured to broadcast messages to a plurality of channel subscribers 540, 550, 560. The system 500 may include a plurality of channels 511, 512, 513. The channel subscribers 540, 550, 560 may be subscribed to one or more of the channels 511, 512, 513, and/or the channels 511, 512, 513 may make interaction requests and/or messages available to one or more of the channel subscribers 540, 550, 560. Broadcasters 531, 532, 533 may transmit the interaction requests and/or messages to the channels 511, 512, 513, and the channels may make the received interaction requests and/or messages available to the channel subscribers 540, 550, 560.

The channel subscribers 540, 550, 560 may each maintain a database 545, 555, 565. The databases 545, 555, 565 may include various information, such as private data, which may include interaction rules and/or personal contact information, that is maintained by the subscribers 540, 550, 560. The channels 511, 512, 513 may retrieve the private data from the databases 545, 555, 565. Based on the retrieved information, the channels 511, 512, 513 may determine how to deliver the message and/or interaction request. The private data may be shared with the channels 511, 512, 513 and/or interaction notification engine (not shown) only and not with the broadcasters 531, 532, 533. Subscribers 540, 550, 560 may share certain private data with broadcasters 531, 532, 533 and may allow one or more broadcasters to use the private data to contact them individually. The same user account and private data may be used by the subscribers 540, 550, 560 to subscribe to a plurality of channels 511, 512, 513.

Figure 6:
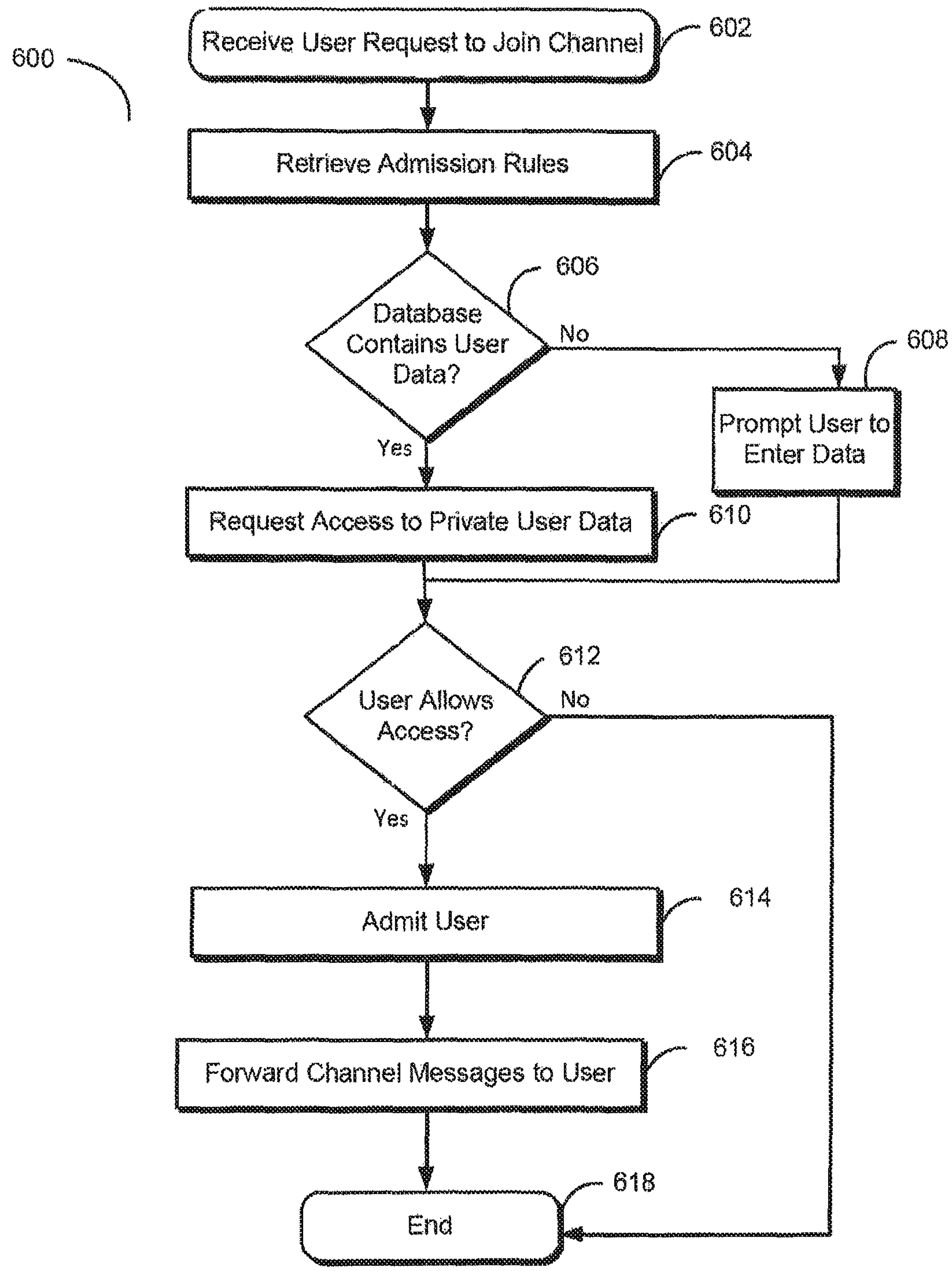
FIG. 6 is a flow diagram for a method of admitting new subscribers to a channel.

FIG. 6 is a flow diagram for a method 600 of admitting new subscribers to a channel. The method 600 may begin when a channel receives 602 a request from a user to subscribe to the channel. The channel may retrieve 604 admission rules to determine what criteria must be met for the user to subscribe to the channel. The admission rules may specify that the user must provide access to private user data. For example, a running channel may require that the user allow access to the user's location and/or that the user specify what distances the user runs. The user's location and/or answers to questions may be added to their private data, which may be maintained by the user and shared with other channels and/or trusted contacts (not shown).

The channel and/or a system comprising user databases may determine 606 whether the user's database contains the private user data required. If the user's database does not contain the data required, the user may be prompted 608 to enter the data. Otherwise, the channel may request 610 access to the private user data in the user's database. The channel may receive 612 a response indicating whether the private user data has been entered into the user's database and/or whether the user allows access to the private user data. If the user does not enter the data when prompted 608 and/or does not allow access to the data, the method 600 may end 618 without admitting the user. Otherwise, the user may be admitted 614 as a channel subscriber or await final approval from an administrator. In some configurations, recent messages may be forwarded 616 to the user, and/or the user may be given access to a history of previous channel messages. The method 600 may end 618 until the next request to join the channel.

Figure 7:
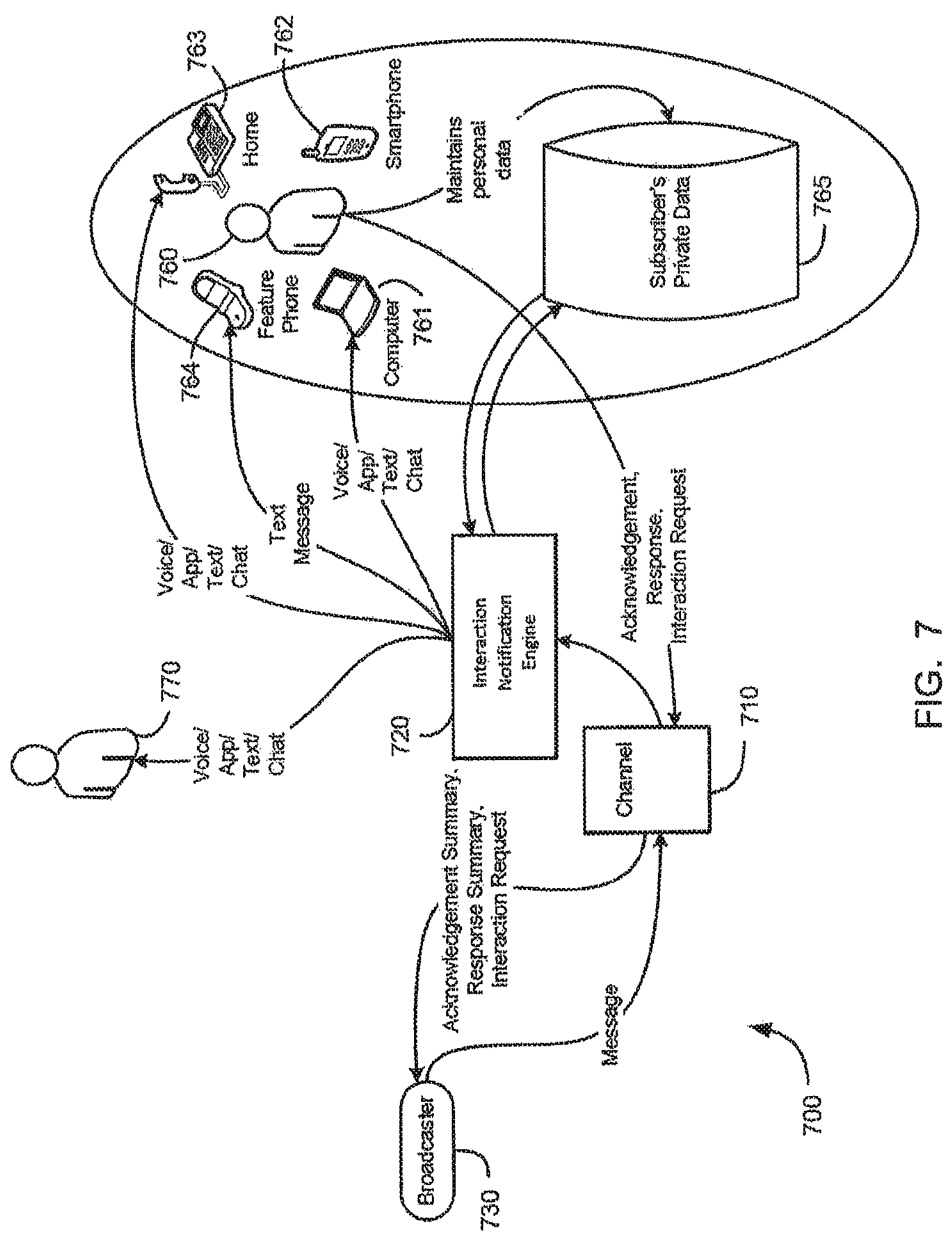
FIG. 7 is a schematic diagram of a system configured to broadcast messages to a channel subscriber.

FIG. 7 is a schematic diagram of a system 700 configured to broadcast messages to channel subscribers, including subscriber 760. A broadcaster 730 may have broadcast rights for the channel 710. The broadcaster 730 may transmit an interaction request and/or a message to the channel 710 for distribution to subscribers. The channel 710 may be configured to process the interaction request and/or message received from the broadcaster 730. The channel 710 may determine that the channel subscriber 760 subscribes to the channel 710 and should receive the interaction request and/or message.

An interaction notification engine 720 may be configured to notify the channel subscriber 760 of new interaction requests and/or messages sent to the channel 710. The channel 710 may notify the interaction notification engine 720 that the interaction request and/or message should be made available to the subscriber 760. Alternatively, the channel 710 may deliver the interaction request and/or message to a message center for the channel subscriber 760, and the interaction notification engine 720 may check the message center for new interaction requests and/or messages. When the interaction notification engine 720 becomes aware of a new interaction request and/or message for the channel subscriber 760, it may attempt to notify the channel subscriber 760.

The interaction notification engine 720 may retrieve the channel subscriber's private data, which may include personal contact information, interaction rules, and/or escalation rules, from a database 765 in which the channel subscriber 760 maintains such information. The private data may be shared with the interaction notification engine 720 and not with the channel 710 and/or broadcaster 730. Based on the retrieved data, the broadcaster 730, the channel 710, and/or data in the interaction request and/or message, the interaction notification engine 720 may determine how to deliver the interaction request and/or message to the channel subscriber 760 and whether the interaction request and/or message should be escalated. For example, a text message may be sent to a feature phone 764, and/or a voice message, text message, chat message, and/or application message may be sent to a computer 761, a smartphone 762, and/or a home phone 763 based on the interaction rules. The broadcaster 730 and/or channel 710 may have no visibility into this escalation process.

The interaction request and/or message may request an acknowledgement and/or response. If an escalated interaction request and/or message is not acknowledged or responded to by the channel subscriber 760, the message may be sent repeatedly, sent to different devices 761, 762, 763, 764, sent to a third party 770, and/or the like. The third party 770 may be a relative or friend of the channel subscriber 760, and/or the third party 770 may be a stranger in the vicinity of the channel subscriber 760. A summary report specifying how many subscribers acknowledged the message, what responses were received, and/or other useful statistics and information may be made available to the broadcaster 730. The broadcaster 730 and the channel 710 may not have access to the channel subscriber's private data. Instead, that information may be shared with the broadcaster 730 only if the channel subscriber 760 explicitly allows it to be shared. The channel subscriber 760 may be allowed to send interaction requests and/or messages back to the broadcaster 730 if the broadcaster 730 and/or channel settings allow. The channel settings may always allow interaction requests replying to the broadcaster 730, never allow interaction requests replying to the broadcaster 730, permit the broadcaster 730 to decide whether to allow interaction requests replying to the broadcast, and/or the like.

Figure 8:
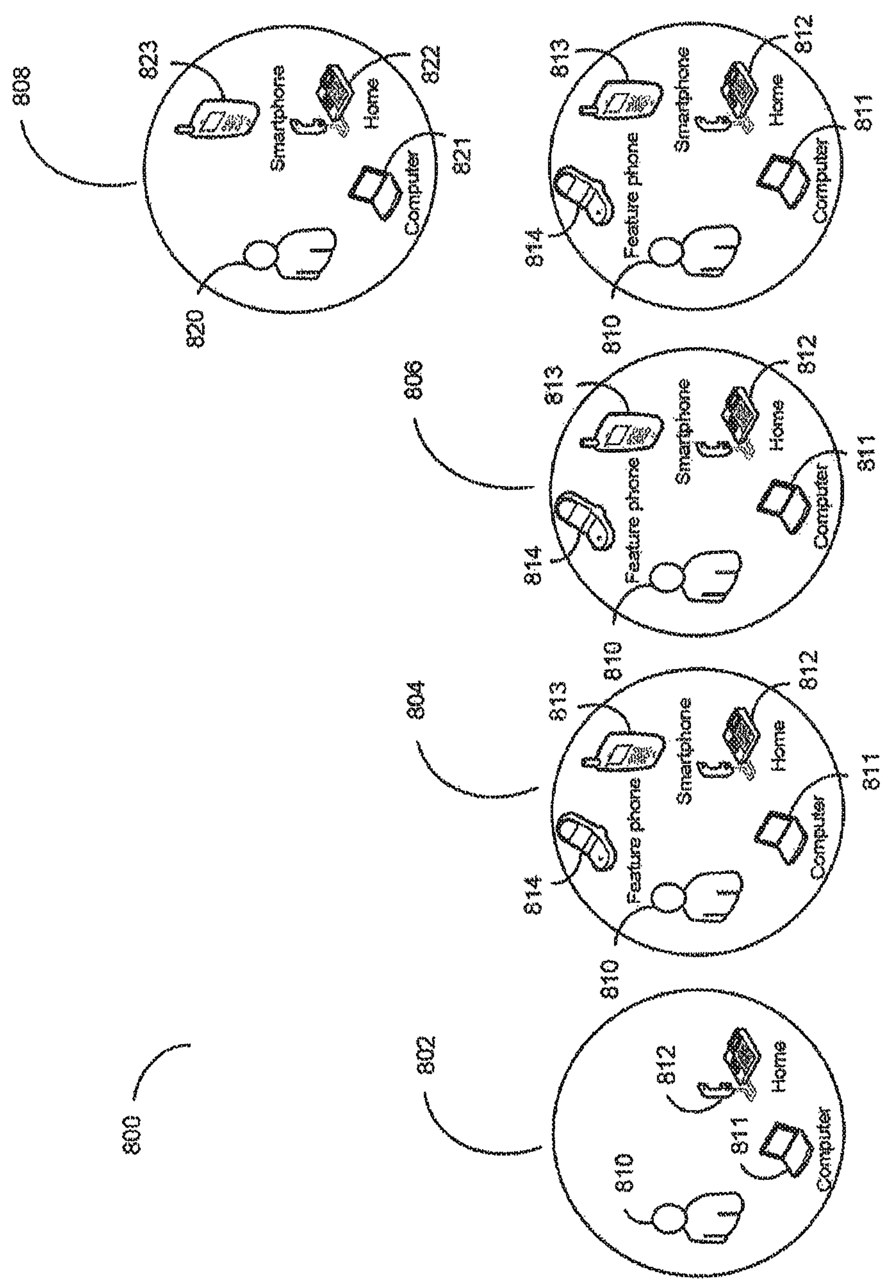
FIG. 8 is a schematic representation of escalation rules for a user.

FIG. 8 is a schematic representation of escalation rules 800 for a user 810. The user 810 may be a channel subscriber (e.g., channel subscriber 760) and/or a receiver of an interaction request (e.g., receiver 160). The escalation rules 800 may be default rules for all channel messages and/or interaction requests received by the user 810. At a first escalation level 802, the user 810 may receive a message on her computer 811 and a call on her home phone 812. If, after a first predetermined time period, the user 810 has not acknowledged the notification, the interaction may escalate to a second escalation level 804. At the second escalation level, the user 810 may again receive a message on her computer 811 and call on her home phone 812. The user 810 may also receive a message via an application on her smartphone 813 and a text message on her feature phone 814.

After a second predetermined time period, the notification may escalate to a third escalation level 806. The second predetermined time period may equal or not equal the first predetermined time period. The third escalation level 806 may be identical to the other escalation levels, and interaction may be attempted using the same devices. A fourth and highest escalation level 808 may be reached after a third predetermined time period. Notification may again be attempted through the user's devices 811, 812, 813, 814 during the fourth escalation level 808. In addition, a computer 821, a home phone 822, and a smartphone 823 of a second user 820 may be messaged. Notification may be repeatedly attempted at the fourth escalation level 808 with delays of a fourth predetermined time interval separating each additional attempt. The repeated attempts at the fourth escalation level 808 may be continued until an acknowledgement is received. Alternatively, escalation may be ended after a predetermined number of delivery attempts. In other embodiments, there may be a different number of escalation levels, and/or different methods may be used to attempt to notify the user 810 at each escalation level.

Figure 9:
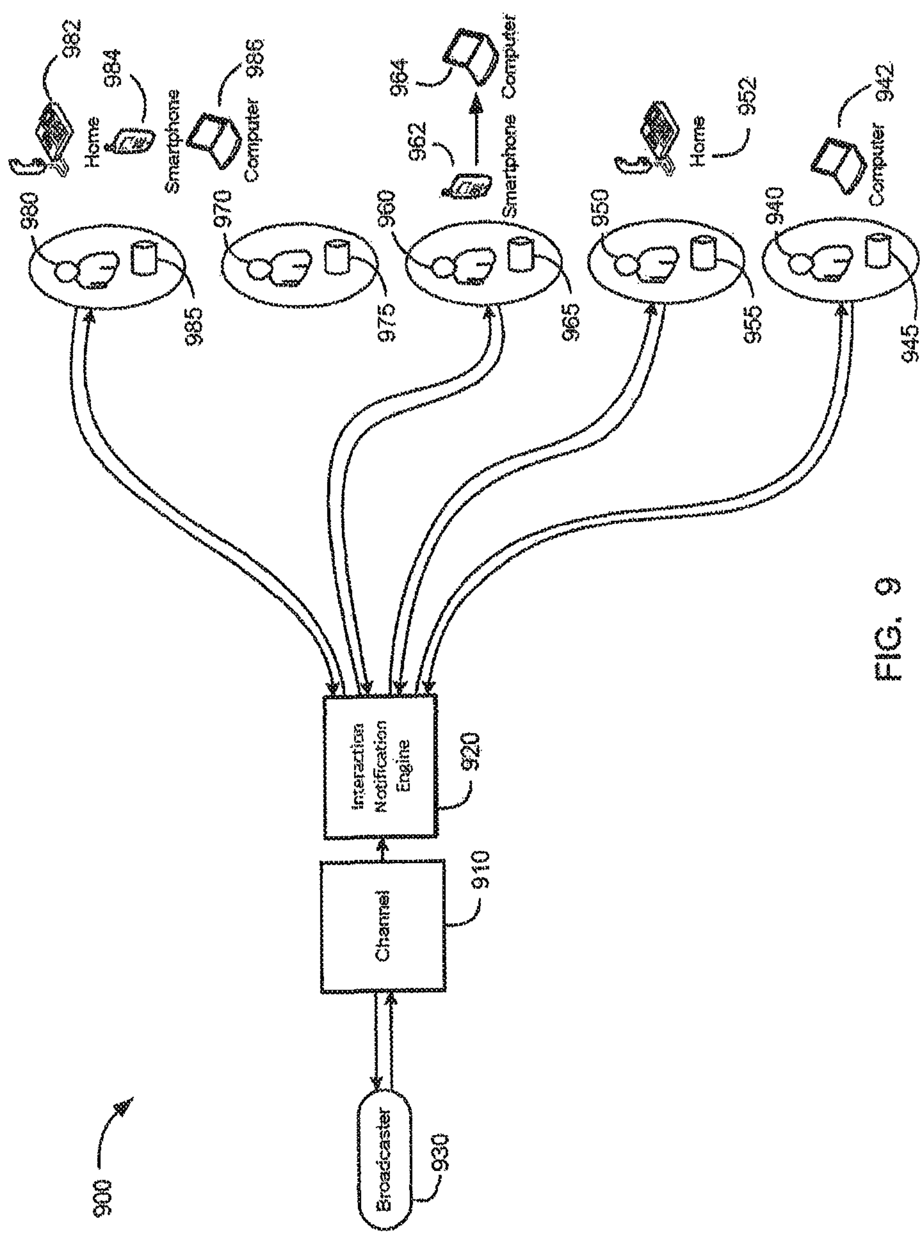
FIG. 9 is a schematic diagram of a system configured to broadcast a message to a dynamically segmented plurality of channel subscribers.

FIG. 9 is a schematic diagram of a system 900 configured to broadcast a message to a dynamically segmented plurality of channel subscribers 940, 950, 960, 980. The broadcaster 930 may wish to send a message only to subscribers that match specific criteria. For example, the broadcaster 930 may desire to broadcast a question to a channel dedicated to avid runners. The broadcaster's question may relate to marathon training, so she may wish to send the message only to subscribers interested in marathons. The channel subscribers 940, 950, 960, 970, 980 may store preferences and/or data in subscriber databases 945, 955, 965, 975, 985, such as specifying the types of races they compete in and/or are interested in. Each channel subscriber 940, 950, 960, 970, 980 may have their own database 945, 955, 965, 975, 985, and/or one database may store information about multiple channel subscribers 940, 950, 960, 970, 980. The channel subscribers 940, 950, 960, 970, 980 may indicate that they wish to be notified only of messages that match their stated interests.

When the broadcaster 930 sends her message with the question about marathon training to the interaction server, she may request dynamic segmentation so that only subscribers interested in marathons receive the message. The channel 910 may send the message to an interaction notification engine 920 to determine which of the channel subscribers 940, 950, 960, 970, 980 should receive the message. In another embodiment, the channel 910 may determine which of the channel subscribers 940, 950, 960, 970, 980 should receive the message, and the interaction notification engine 920 may notify the channel subscribers 940, 950, 960, 970, 980 after the channel 910 has delivered the message to each channel subscriber's message center. The interaction notification engine 920 may automatically access the databases 945, 955, 965, 975, 985 to determine the subscribers 940, 950, 960, 980 interested in marathons. The dynamic segmentation may occur without the broadcaster 930 having access to the private data used to determine to whom to broadcast the message. The interaction notification engine 920 may determine the dynamic segmentation without sharing any private data with the broadcaster 930.

The interaction notification engine 920 may send a notification to the subscribers 940, 950, 960, 980, which may include the message, a copy of the message, a predetermined number of characters from the message, a link to the message, and/or the like. A first subscriber 940 and a second subscriber 950 may have indicated in their information that they have previously run marathons, so the message may be delivered to them. Based on interaction rules in their databases 945, 955, the interaction notification engine 920 may determine that the message should be sent to the first subscriber's computer 942 and the second subscriber's home phone 952.

A third subscriber 960 may have indicated that he is interested in marathons. The third subscriber 960 may own a small athletic store and may wish to be notified immediately of messages to the channel. The third subscriber 960 may specify in his escalation rules that any messages to the channel should first be sent to his smartphone 962 and, if no response is received, escalated to his computer 964. A fourth subscriber 970 may have specified that she does not run any distances longer than ten kilometers, so the message may not be delivered to her. A fifth subscriber 980 may also be interested in marathons because she is training for a marathon. The fifth subscriber 980 may want to ensure that she receives all messages from the channel, so the interaction rules for the fifth subscriber 980 may specify that all messages should be delivered to the fifth subscriber's home phone 982, smartphone 984, and computer 986. Acknowledgement, response, and/or dynamic segmentation statistics, such as the number of subscribers satisfying the submitted criteria, may be made available to the broadcaster 930.

Figure 10:
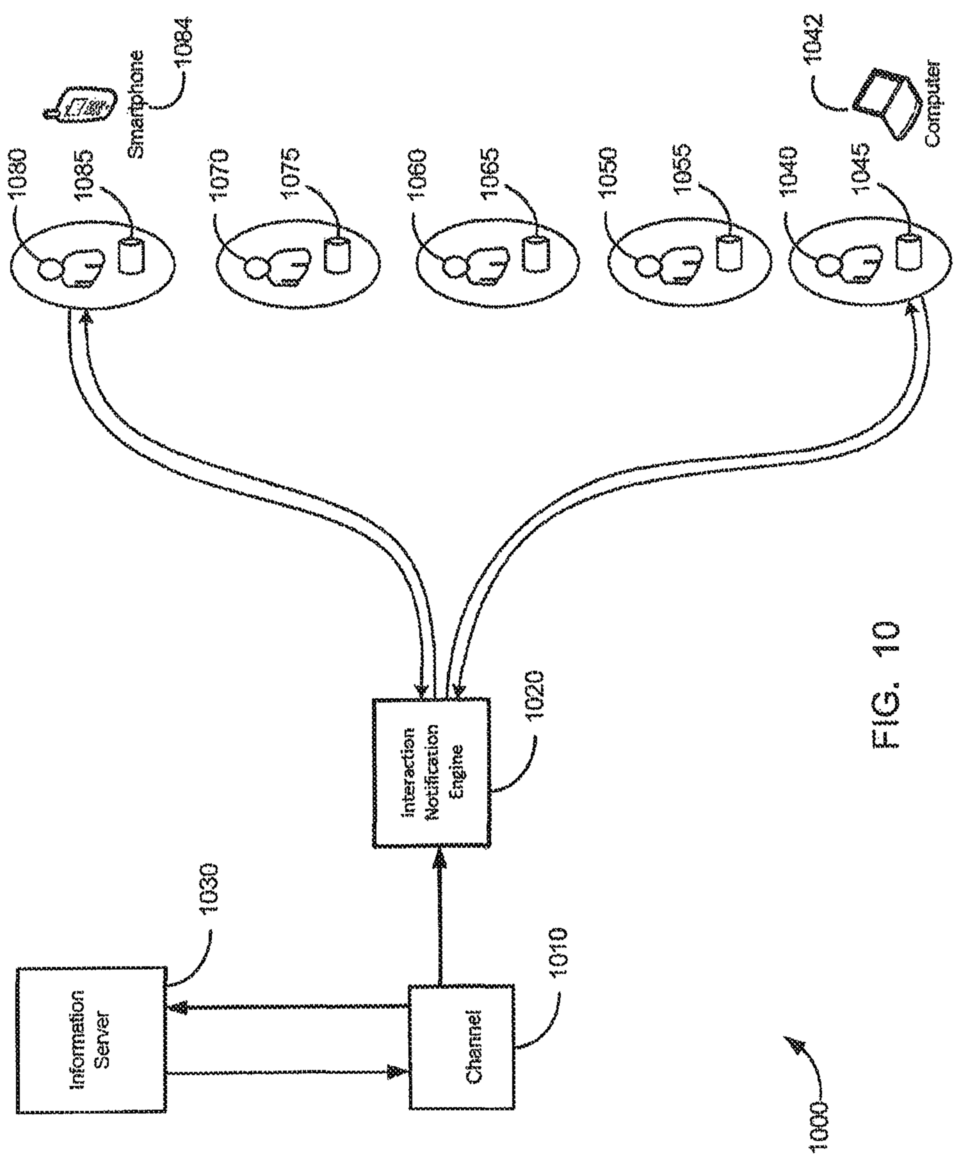
FIG. 10 is a schematic diagram of a system configured to broadcast automatic messages to interested channel subscribers.

FIG. 10 is a schematic diagram of a system 1000 configured to broadcast automatic messages to interested channel subscribers 1040, 1080. A channel 1010 may periodically receive and/or retrieve information from an information server 1030, and/or the channel 1010 may compute information. In the illustrated embodiment, there is a single information server 1030. In other embodiments, there may be more than one information server from which content is aggregated.

In one example, the channel 1010 may request information about upcoming running races from the information server 1030 and may determine that a half-marathon in San Francisco has been added to the list of races stored in the information server 1030. The channel 1010 may send the information to an interaction notification engine 1020 to determine which subscribers should receive notification of the information. The first and fifth subscribers 1040, 1080 may live in San Francisco and may have specified in their databases 1045, 1085 that they would like to receive messages about upcoming races of interest. The interaction notification engine 1020 may broadcast an automatic message about the race to the first and fifth subscribers 1040, 1080. The second subscriber 1050 may live in San Francisco but not want to receive automatic messages about upcoming races, the third subscriber 1060 may only be interested in races on the East Coast, and the fourth subscriber 1070 may only run races of ten kilometers or less. The interaction notification engine 1020 may determine from the databases 1055, 1065, 1075 for these subscribers that the second subscriber 1050 does not wish to receive messages and that the location and distance are inapplicable for the third and fourth subscribers 1060, 1070 respectively, so the messages may not be transmitted and/or made available to them.

Figure 11:
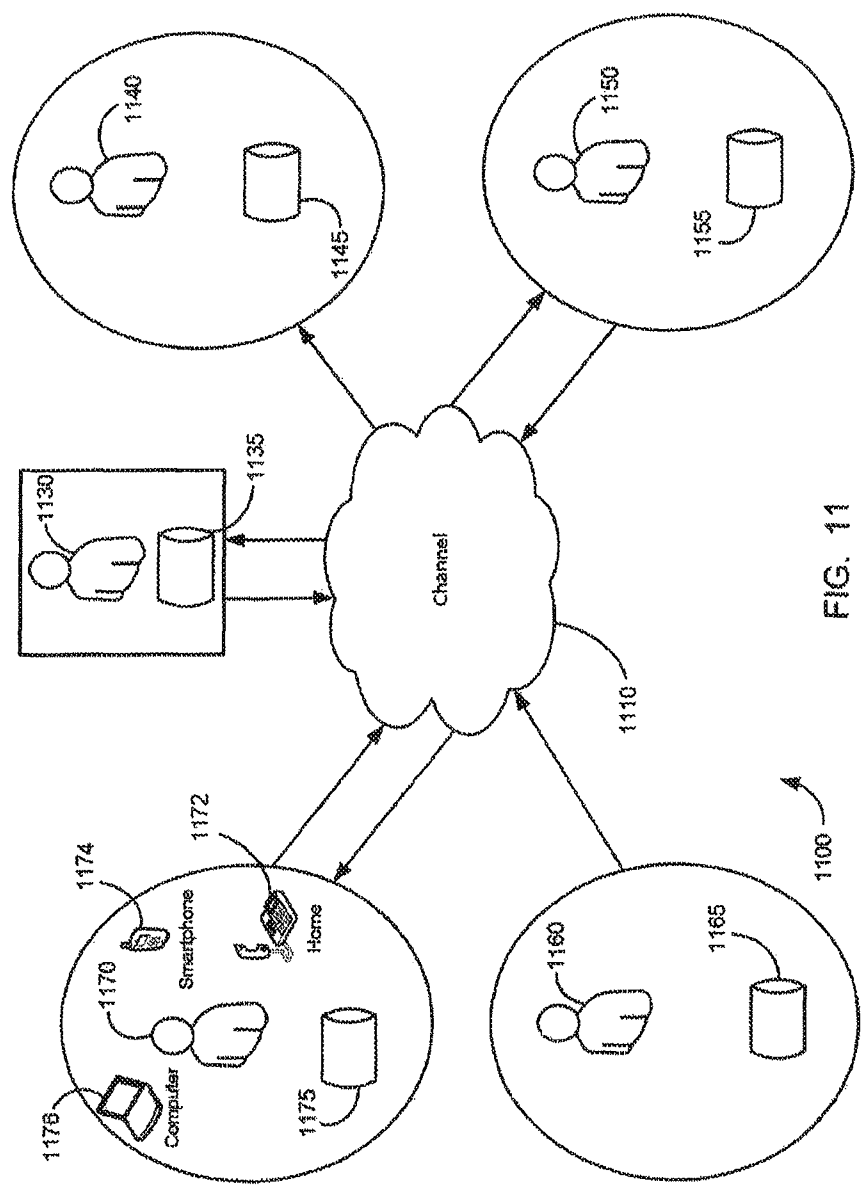
FIG. 11 is a schematic diagram of a system for interaction among a plurality of channel subscribers.

FIG. 11 is a schematic diagram of a system 1100 for communication among a plurality of channel subscribers 1130, 1140, 1150, 1160, 1170. A channel 1110 may be configured to allow the plurality of channel subscribers 1130, 1150, 1160, 1170 to broadcast interaction requests and/or messages to one another and/or to view one another's private data. For example, the channel 1110 may be a channel for a family. The channel 1110 may allow the family to leverage many of the features discussed herein. Messages may be dynamically segmented among the channel subscribers 1130, 1140, 1150, 1160, 1170, so messages only relevant to some family members may only get delivered to those channel subscribers 1130, 1140, 1150, 1170. The channel 1110 may also allow for one-to-one communication among any two of the channel subscribers 1130, 1140, 1150, 1160, 1170. Messages may be escalated to a plurality of devices 1172, 1174, 1176 for a channel subscriber 1170 to ensure important and/or urgent messages are received. The channel subscribers 1130, 1140, 1150, 1160, 1170 may each maintain a database 1135, 1145, 1155, 1165, 1175, which may contain private data, such as personal contact information, interaction rules, escalation rules, and/or the like. The information in the databases 1135, 1145, 1155, 1165, 1175 may be used by the channel 1110 and/or an interaction notification engine (not shown) to determine how to deliver message, and/or the information may be shared among the channel subscribers 1130, 1140, 1150, 1160, 1170, such as family members sharing mailing addresses and other personal contact information.

An administrator 1130 may control rules for the channel 1110. The administrator 1130 may allow some channel subscribers 1130, 1150, 1160, 1170 to broadcast messages and may not allow other channel subscribers 1140 to broadcast messages, such as a child in the family. The administrator 1130 may also decide to whom each channel subscriber 1130, 1140, 1150, 1160, 1170 may broadcast. The channel subscribers 1130, 1140, 1150, 1160, 1170 may be permitted to broadcast to all other channel subscribers 1130, 1140, 1150, 1160, 1170, a dynamically segmented subset, specific individual channel subscribers 1130, 1140, 1150, 1160, 1170, and/or the like. The administrator 1130 may be able to change the rules for the channel 1110 at will.

In another example, the channel 1110 may be operated by a school, and the channel subscribers 1130, 1140, 1150, 1160, 1170 may include parents, students, teachers, staff, and the like. The school may be able to broadcast urgent messages to parents and students, such as a school closing due to a weather emergency. Parents may also be allowed to send messages, which may include urgent messages, back to the school. The school may allocate and/or assign messages received from parents to teachers and/or staff for a response. Students and/or parents may or may not be permitted to send messages to other students and parents. The channel subscribers 1130, 1140, 1150, 1160, 1170 may be able to interact with shared data. Thus, a teacher may be able to create a parent-teacher conference signup request and use dynamic segmentation to share it with only the parents of her students. The parents may be able to see what time slots are available and reserve time slots, which may be marked as unavailable immediately upon reservation.

It will be understood by those having skill in the art that many changes may be made to the details of the above-described embodiments without departing from the underlying principles of the disclosure. The scope of the present disclosure should, therefore, be determined only by the following claims.

The invention claimed is:

1. A system for group messaging, the system comprising:
a processor; and
memory communicatively coupled with the processor, the memory storing instructions which, when executed by the processor, cause the system to:
process a message from a sending user resource of a sender to identify a destination channel for the message, the destination channel identified by a single unique identifier usable to receive a plurality of types of interactions;
identify two or more users subscribed to the channel, the two or more users comprising at least a first user and a second user, the first user configured to receive messages through a first user resource and the second user configured to receive messages through a second user resource, the first user resource reachable using first private contact data and the second user resource reachable using second private contact data;
determine that the sender is authorized to send to the channel based on the sender being subscribed to the channel or being an owner of the channel, wherein the channel allows subscribers to the channel to send messages to one or more user resources of other subscribers of the channel without exposing private contact data of the one or more user resources of the other subscribers;
identify the one or more user resources corresponding to each user subscribed to the channel, wherein the single unique identifier of the channel is exposed to each user subscribed to the channel and the private contact data of the one or more user resources corresponding to each user subscribed to the channel are private from the sender and the other users subscribed to the channel; and
forward the message to a user resource of the one or more user resources using the private contact data for each subscribed user without exposing the private contact data of the user resource to the sender or other subscribed users, wherein forwarding the message comprises forwarding to a user resource of the first user using the first private contact data and a user resource of the second user using the second private contact data, and wherein at least one of a sender resource used to send the message and the user resource of the first user comprises a different resource type than the user resource of the second user.

2. The system of claim 1, wherein the memory further stores instructions to cause the computer system to forward the message without indicating a user resource of the sender from which the message was sent.

3. The system of claim 1, wherein the memory further stores instructions to cause the computer system to modify or convert the message from a first type to a second type, wherein the first type corresponds to a type of the message received from the sender and wherein the second type corresponds to a type of message corresponding to the user resource of the second user, and wherein forwarding the message comprises forwarding the modified or converted message to the second user.

4. The system of claim 3, wherein the first type and the second type are selected from the group consisting of an email message, a short message service (SMS) message, a multimedia messaging service (MMS) message, an instant message, an application message, a device notification, a social media message, a voice message, a phone call, a video message, a video call, multimedia data, a request for user data, an integrated public alert and warning system (IPAWS) alert, a chat message, a verification code, an authorization code, a wireless application protocol (WAP) message, and postal mail.

5. The system of claim 1, wherein the memory further stores instructions to cause the computer system to select the resource of the first user from one or more user resources corresponding to the first user based on interaction rules for the first user.

6. The system of claim 1, wherein the memory further stores instructions to cause the computer system to send the sender an acknowledgement that the message from the sender has been received.

7. The system of claim 1, wherein the memory further stores instructions to cause the computer system to determine that the message was delivered to a user resource or device corresponding to a user.

8. The system of claim 7, wherein the memory further stores instructions to cause the computer system to send an acknowledgement to the sender that the message was delivered to a user resource or device corresponding to a user.

9. The system of claim 1, wherein the memory further stores instructions to cause the computer system to process an acknowledgement from at least one user of the two or more users subscribed to the channel indicating that the at least one user received the message.

10. The system of claim 9, wherein the acknowledgement indicates that the user explicitly acknowledged receipt or responded to the message.

11. The system of claim 9, wherein the memory further stores instructions to cause the computer system to forward an indication of the acknowledgement to the sender.

12. The system of claim 1, wherein the memory further stores instructions to cause the computer system to initiate an escalation process for at least one user of the two or more users.

13. The system of claim 12, wherein the escalation process comprises repeatedly routing at least one of the message, a notice of the message, and a payload associated with the message to the at least one user.

14. The system of claim 12, wherein the escalation process comprises routing at least one of the message, a notice of the message, and a payload associated with the message to a plurality of user resources associated with the at least one user.

15. The system of claim 12, wherein routing to a plurality of user resources associated with the specific user comprises routing to another user or another device within a vicinity of the at least one user.

16. The system of claim 12, wherein the escalation process comprises changing a volume on a device corresponding to the at least one user.

17. The system of claim 12, further comprising ending the escalation process in response to receiving an indication that the at least one user received the message.

18. The system of claim 12, wherein the instructions cause the computer system to initiate the escalation process in response to a timer expiring without receiving an indication that the at least one user received the message.

19. The system of claim 1, wherein forwarding the message comprises forwarding to a user resource of at least one user in response to the at least one user being in or entering a predetermined area or predetermined distance from the sender.

20. The system of claim 1, wherein the message from the sender comprises an indication of a subset of users of the channel to which to send the message, wherein the subset comprises the first user and the second user, and wherein forwarding the message comprises forwarding the message only to user resources for users in the subset.

21. The system of claim 1, wherein the sender comprises one or more of a device, a server, or an automated program.

22. A computer implemented method for group messaging, the method comprising:

processing a message a sending user resource of to identify a destination channel for the message, the message including a channel identifier usable to receive a plurality of types of interactions;

identifying two or more users subscribed to the channel, the two or more users comprising at least a first user and a second user, the first user configured to receive messages through a first user resource and the second user configured to receive messages through a second user resource, the first user resource reachable using first private contact data and the second user resource reachable using second private contact data;

determining that the sender is authorized to send to the channel based on the sender being subscribed to the channel or an owner of the channel, wherein subscribers to the channel are authorized to send messages to one or more user resources of other subscribers of the channel without exposing private contact data of the one or more user resources of the other subscribers;

identifying the one or more user resources corresponding to each user subscribed to the channel, wherein the channel identifier is exposed to each user subscribed to the channel and the private contact data of the one or more user resources corresponding to each user subscribed to the channel are private from the sender and the other users subscribed to the channel; and forwarding the message to a user resource of the one or more user resources resources using the private contact data for each subscribed user without disclosing private contact data of the user resource to the sender or other subscribed users, wherein forwarding the message comprises forwarding to a user resource of the first user using the first private contact data and a user resource of the second user using the second private contact data, and wherein at least one of a sender resource used to send the message and the user resource of the first user comprises a different resource type than the user resource of the second user.

23. The computer implemented method of claim 22, wherein an indication of one or more user resources corresponding to a specific user are maintained by the specific user.

24. The computer implemented method of claim 23, wherein the method further comprises updating, modifying, or deleting the indication of the one or more user resources for the specific user based on input from the specific user.

25. The computer implemented method of claim 23, wherein when a user deletes the indication of the one or more user resources or unsubscribes from the channel, the user resources of the user no longer receive messages from the channel.

26. The computer implemented method of claim 22, wherein the method further comprises modifying or converting the message from a first type to a second type, wherein the first type corresponds to a type of the message received from the sender and wherein the second type corresponds to a type of message corresponding to the user resource of the second user, and wherein forwarding the message comprises forwarding the modified or converted message to the second user.

27. The computer implemented method of claim 26, wherein the first type and the second type are selected from the group consisting of an email message, a short message service (SMS) message, a multimedia messaging service (MMS) message, an instant message, an application message, a device notification, a social media message, a voice message, a phone call, a video message, a video call, multimedia data, a request for user data, an integrated public alert and warning system (IPAWS) alert, a chat message, a verification code, an authorization code, a wireless application protocol (WAP) message, and postal mail.

28. The computer implemented method of claim 22, wherein the method further comprises receiving an acknowledgement from at least one user of the two or more users subscribed to the channel indicating that the at least one user received the message.

29. The computer implemented method of claim 22, wherein the method further comprises forwarding an indication of the acknowledgement to the sender.

30. The computer implemented method of claim 22, wherein the method further comprises initiating an escalation process for a specific user of the two or more users in response to a delay in response to the message from the specific user, wherein the escalation process comprises one or more of:

repeatedly routing at least one of the message, a notice of the message, and a payload associated with the message; and routing to a plurality of user resources at least one of the message, a notice of the message, and a payload associated with the message.

31. The computer implemented method of claim 22, further comprising determining whether the sender is authorized to send the message to the channel based on one or more of:

a code provided with the message;

whether the sender is subscribed to the channel; or one or more rules accepted by an owner of the channel.

32. A system for group messaging, the system comprising:

a processor; and memory communicatively coupled with the processor, the memory storing instructions which, when executed by the processor, cause the system to:

process a message from a sender to identify a destination channel for the message, the destination channel identified by a channel identifier usable to receive a plurality of types of interactions;

determine that the sender is authorized to send to the channel based on one or more of, a code provided with the message, the sender being an owner of the channel, the sender being subscribed to the channel, or one or more rules accepted by an owner of the channel;

identify two or more users subscribed to the channel, the two or more users comprising at least a first user and a second user, the first user configured to receive messages through a first user resource and the second user configured to receive messages through a second user resource, the first user resource reachable using first private contact data and the second user resource reachable using second private contact data;

identify one or more user resources corresponding to each user subscribed to the channel, wherein the channel identifier is exposed to each user subscribed to the channel and private contact data of the one or more user resources corresponding to each user subscribed to the channel are private from the sender and the other users subscribed to the channel;

select a resource from the one or more user resources for at least one of the two or more users based on an interaction rule for the at least one of the two or more users;

forward the message to the selected user resource for each subscribed user using the private contact data without exposing private contact data of the selected user resource to the sender or other subscribed users, wherein forwarding the message comprises forwarding to a user resource of the first user using the first private contact data and a user resource of the second user using the second private contact data, and wherein at least one of a sender resource used to send the message and the user resource of the first user comprises a different resource type than the user resource of the second user;

receiving an acknowledgement from at least one user of the two or more users subscribed to the channel indicating that the at least one user received the message; and forwarding an indication of the acknowledgement to the sender.

* * * * *